United States Patent [19]
Ault et al.

[11] Patent Number: 5,754,542
[45] Date of Patent: May 19, 1998

[54] METHOD AND APPARATUS FOR SYSTEM DETERMINATION IN A MULTI-MODE SUBSCRIBER STATION

[75] Inventors: Jan C. Ault, Santee; Paul T. Williamson, San Diego; Ilan Peer, La Jolla; Jennifer A. Isaac, San Diego; Alejandro R. Holcman, San Diego; Gwain Bayley, San Diego, all of Calif.

[73] Assignee: Qualcomm Incorporated, San Diego, Calif.

[21] Appl. No.: 509,719

[22] Filed: Jul. 31, 1995

[51] Int. Cl.$^6$ .................................................. H04B 7/216
[52] U.S. Cl. .................... 370/342; 370/331; 370/441; 455/553; 455/426
[58] Field of Search ................... 370/441, 342, 370/320, 331, 335, 332; 455/33.1, 54.2, 33.2, 54.1, 426, 553, 574, 83, 86, 552, 572; 379/59, 60, 58; 340/825; 375/216, 200

[56] References Cited

U.S. PATENT DOCUMENTS

| | | | |
|---|---|---|---|
| 4,905,301 | 2/1990 | Krolopp et al. | 455/34 |
| 4,972,455 | 11/1990 | Phillips et al. | 379/58 |
| 5,008,925 | 4/1991 | Pireh | 455/340 |
| 5,020,092 | 5/1991 | Phillips et al. | 379/59 |
| 5,020,093 | 5/1991 | Pireh | 379/59 |
| 5,128,959 | 7/1992 | Bruckert | 375/1 |
| 5,313,489 | 5/1994 | Menich et al. | 370/332 |
| 5,335,355 | 8/1994 | Tanaka et al. | 455/33.1 |
| 5,345,467 | 9/1994 | Lomp et al. | 370/331 |
| 5,422,931 | 6/1995 | Austin-Lazarus et al. | 455/553 |
| 5,442,806 | 8/1995 | Barber et al. | 455/33.1 |
| 5,550,893 | 8/1996 | Heidari | 455/553 |

FOREIGN PATENT DOCUMENTS

| | | | |
|---|---|---|---|
| 2077095 | 3/1993 | Canada | H04Q 7/32 |
| 6232805 | 8/1994 | Japan | H04B 7/26 |
| 9402219 | 12/1994 | WIPO | H04B 7/216 |
| 9517077 | 6/1995 | WIPO | H04Q 7/32 |
| 9612377 | 4/1996 | WIPO | H04Q 7/32 |

*Primary Examiner*—Wellington Chin
*Assistant Examiner*—Melissa Kay Carman
*Attorney, Agent, or Firm*—Russell B. Miller; Roger W. Martin

[57] ABSTRACT

A method and apparatus for selecting a communication system in a multi-mode subscriber station. In the exemplary embodiment, the subscriber station capable of operating in both CDMA and analog modes comprises a analog modulation and demodulation and processing element and a CDMA modulation and demodulation and processing element and a system determination element. System determination element examines exit parameters provided by the communication element exited and determines the next system upon which to attempt acquisition in accordance with a system preferences table, a CDMA channel table and a non-volatile memory element.

17 Claims, 20 Drawing Sheets

METHOD AND APPARATUS FOR SYSTEM DETERMINATION IN A MULTI-MODE SUBSCRIBER STATION

BACKGROUND OF THE INVENTION

I. Field of the Invention

The present invention relates to communication systems. More particularly, the present invention relates to a novel and improved method and apparatus for selecting a system to use in a mobile station capable of operating in both analog and code division multiple access (CDMA) environments based on a set of user preferences.

II. Description of the Related Art

In the growing stages of the digital cellular market, a need for telephones that are capable for operation in both digital and analog environments is strongly felt. Code Division Multiple Access (CDMA) systems have demonstrated clear advantages over time division multiple access (TDMA), frequency division multiple access (FDMA) and other digital multiple access cellular communication systems. A detailed description of a preferred embodiment of a CDMA cellular communication system is present in U.S. Pat. No. 5,103,459 entitled "SYSTEM AND METHOD FOR GENERATING SIGNAL WAVEFORMS IN A CDMA CELLULAR TELEPHONE SYSTEM" and U.S. Pat. No. 4,901,307 entitled SPREAD SPECTRUM MULTIPLE ACCESS COMMUNICATION SYSTEM USING SATELLITE OR TERRESTRIAL REPEATERS", the disclosures of both are assigned to the assignee of the present invention and incorporated herein by reference.

In addition, there is an anticipated period of time in which certain areas will continue to be served only by analog systems. For this reason, there is a need for a cellular telephones that accommodate usage on both traditional analog and CDMA environments.

SUMMARY OF THE INVENTION

The present invention is a novel and improved method and apparatus for a custom system selection process, in other words system determination, in a multi-mode mobile handset. Though the present invention is described in an exemplary implementation of a dual mode CDMA/analog mobile station, the disclosure teaches a method that is easily extendible to accommodate a multi-mode mobile station environment such as CDMA/analog/TDMA.

In the exemplary embodiment of the present invention, the subscriber station transitions to analog mode or CDMA mode based on the results of system determination processing. This system determination processing is performed by a microprocessor or micro-controller programmed to perform the operations as described below. The microprocessor or micro-controller operates in conjunction with a memory element which store the user system preferences and system parameters based on previous calls or call attempts. The memory element may be a part of the microprocessor or micro-controller or it may be a separate memory element.

It is an object of the invention to provide a method and apparatus for providing system selection criteria for a multi-mode mobile station. The present invention determines the next operating mode of the subscriber station in accordance with (1) a set of system determination rules, (2) a set of user preferences and (3) an exit reason from the system from which acquisition was last attempted. The present invention discloses a method and apparatus that conforms with Telecommunications Industry Association (TIA) Interim Standard entitled "Mobile Station-Base Station Compatibility Standard For Dual-Mode Wideband Spread Spectrum Cellular system TIA/EIA/IS95".

It is an object of the present invention to provide a method and apparatus for selecting a system for acquisition in accordance with a set of user-defined preferences. By providing system selection in accordance with a predefined ordered set of user preferences, the operation of the subscriber station is optimized for the user's personal needs. For example, costs to the user may be minimized (e.g. reduced roaming charges). In the present invention, the user preferences are stored in a nonvolatile memory. The possible user preferences are flexible so that the systems the subscriber station attempts to acquire may be diverse or restricted.

It is further an object of the present invention to provide fast acquisition for the user. The method of the present invention selects a system other than the user's preferred system, if the preferred system cannot be acquired. If the system acquired is not the preferred system, then apparatus of the present invention will intermittently enter the system determination mode to determine whether the preferred system can be acquired at that time. The system intermittently checks if the preferred system is available based upon a timer which is set if the subscriber station is not operating using the preferred system.

In the present invention, a CDMA channel table is maintained that provides the CDMA channel which is most likely to be able to provide service (i.e. primary or secondary CDMA channel). By maintaining a CDMA channel table, the present invention minimizes acquisition time in CDMA acquisition attempts. The CDMA channel table is reordered each time a CDMA channel different from the top entry in the table is acquired.

The present invention maintains a system preferences table, which specifies an ordered list of systems upon which acquisition will be attempted. The present invention generates an exit reason each time the subscriber station enters system determination. This exit reason is used to position a pointer in the system preferences table directing the subscriber station to the next system upon which to attempt acquisition. In addition, the system determination processor uses information from the system preferences table to generate entry parameters in the acquisition of a system.

It is yet another advantage to the present invention to reduce the time for re-acquisition. The system determination processor provides a service resume function wherein the subscriber station attempts to acquire service in a form identical to the service provided prior to the termination of the previous call or service. A service resume function prevents the active hardware in the subscriber station from powering down, which results in net power and time savings from not having to power up the hardware. In addition, time savings is attained while in CDMA mode because a full reacquisition is not required by taking advantage of existing timing information.

It is also an advantage of the present system to provide a fast response to a user's request for service. The system determination processor maintains a pointer indicating the system where the service was last available. If an acquisition attempt is aborted, then acquisition is attempted on the last system known to have service. This results in a substantial time savings in acquisition.

It is further an object of the present invention to provide a method and apparatus for performing a CDMA to analog hand-off. The system of the present invention is easily extendible to providing an analog to CDMA hand-off simply by addition of additional exit reasons. Moreover, the present invention is of a modular format that is easily extendible to meet the growing service needs of users.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
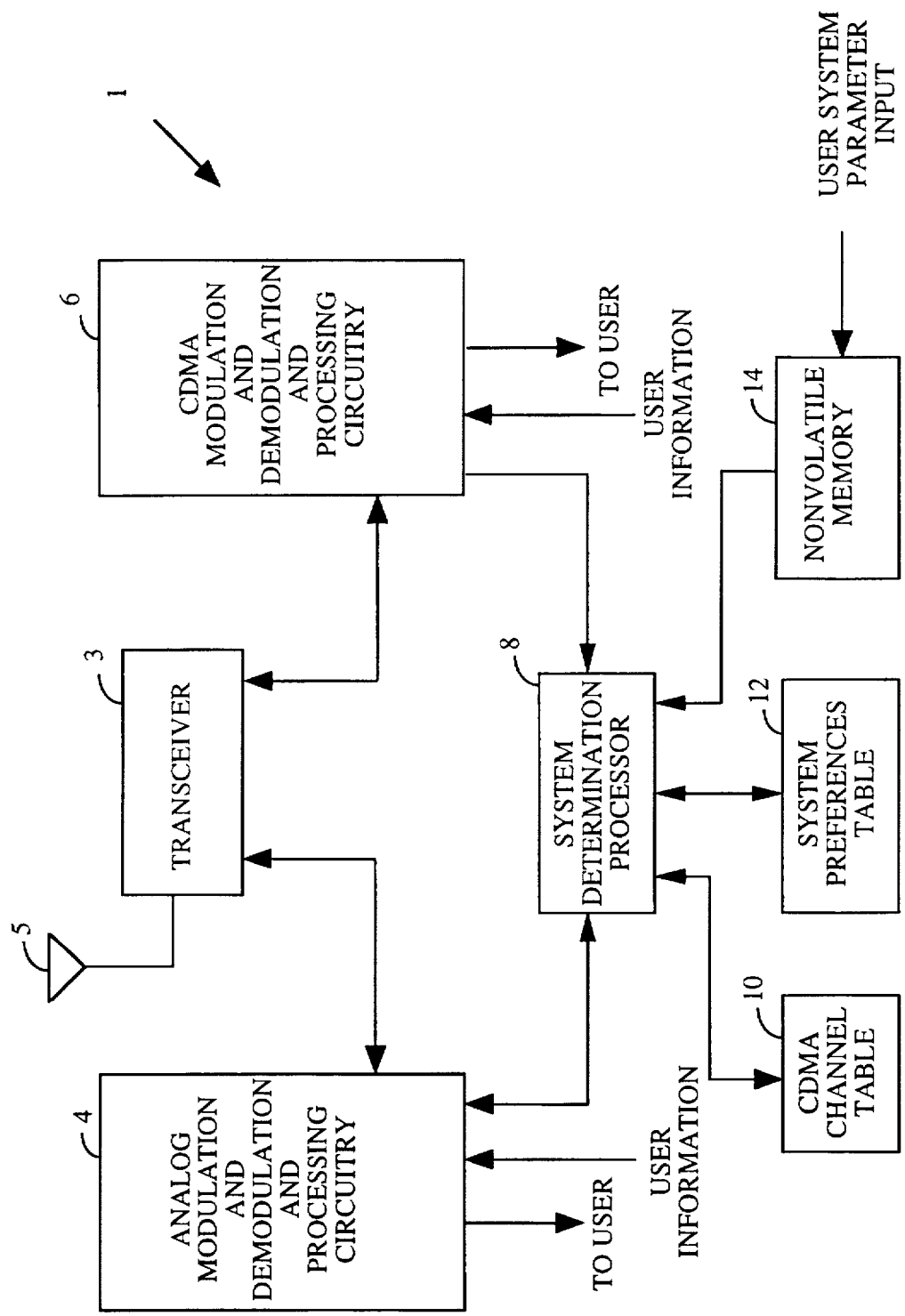
FIG. 1 is a block diagram of the subscriber station of the present invention.

Referring to FIG. 1, when multi-mode subscriber station MMSS 1 is in a system determination substate then the operations are conducted by system determination processor 8. In the system determination substate, system determination processor 8 selects the communication system for MMSS 1 to use. The exemplary embodiment of MMSS 1 is a dual mode mobile station capable of both analog transmission and reception and code division multiple access (CDMA) transmission and reception. System is defined here as the combination of the serving-system and operating mode. In the exemplary embodiment, possible operating modes include CDMA and analog.

System determination processor 8 provides acquisition parameters to analog modulation and demodulation and processing circuitry 4 and CDMA modulation and demodulation and processing circuitry 6. Which they use in preparing to acquire a communication system.

System determination processor 8 also provides system information to transceiver 3. The system information specifies the frequency of the system selected to acquire. Transceiver 3 upconverts the modulated data from analog modulation and demodulation and processing circuitry 4 and CDMA modulation and demodulation and processing circuitry 6 in accordance with this frequency information.

Transceiver 3 also down converts signal received through antenna 5 in accordance with the frequency information provided by system determination processor 8. The downconverted received signal from transceiver 3 is selectively provided to analog modulation and demodulation and processing circuitry 4 and CDMA modulation and demodulation and processing circuitry 6 depending upon which is operational.

If the received signal is CDMA in nature then CDMA modulation and demodulation and processing circuitry 6 demodulates the received signal in accordance with a CDMA demodulation format as is described in detail in the aforementioned U.S. Pat. Nos. 5,103,459 and 4,901,307. The demodulated data is then provided to the user of multi mode subscriber station (MMSS) 1. If the received signal is analog in nature then analog modulation and demodulation and processing circuitry 4 demodulates the received signal in accordance with an analog demodulation format. The demodulated data is provided to the user of multi mode subscriber station (MMSS) 1.

System determination processor 8 selects the communications system to acquire in accordance with information from CDMA channel table 10 and system preferences table 12. In the exemplary embodiment, CDMA channel table 10 and system preferences table 12 are implement in random access memory (RAM) which may be part of the system determination processor or may be separate RAM memory. System determination processor 8 builds CDMA channel table 10 and system preferences table 12 in accordance with user preferences stored in nonvolatile memory 14. In the exemplary embodiment, nonvolatile memory 14 is implemented in a programmable read only memory (PROM).

System determination is influenced by a set of expressed user preferences. In an exemplary embodiment, user preferences may include:

Serving-system A (or B) only
Serving-system A (or B) preferred
CDMA (or analog) mode only
CDMA (or analog) mode preferred These system preferences are stored in nonvolatile memory element 14. In the exemplary embodiment, nonvolatile memory element 14 is a programmable read only memory.

A serving system identifies a frequency band upon which MMSS 1 performs an acquisition attempt. In the exemplary embodiment, there are two serving systems (A or B) though the present invention is easily extendible to a communication systems having any number of serving systems.

MMSS 1 can be in one of two system states: online or offline. Online is the normal operational state for MMSS 1. Offline is a state which MMSS 1 enters for diagnostic purposes and when an anomaly is discovered in the power up of MMSS 1 which prohibits its normal operation. In the exemplary embodiment, within the online state, MMSS 1 can be in one of two modes: analog or digital. In the exemplary embodiment the digital mode is CDMA.

In analog mode, MMSS 1 is performing analog call processing. In analog mode operation user information is provided to analog modulation and demodulation and processing circuitry 4 which modulates the user information in accordance with an analog format and provides the modulated data to transceiver 3. Transceiver 3 upconverts and amplifies the signal and broadcasts the signal through antenna 5.

Data is received in analog operation by MMSS 1 by antenna 5 and provided to transceiver 3 where it is downconverted and amplified and provided to analog modulation and demodulation and processing circuitry 4 where the signal is demodulated in accordance with an analog format and provided to the user of MMSS 1. The design and implementation of analog modulation and demodulation and processing circuitry 4 is well known in the art and described in detail in *Mobile Cellular Telecommunications Systems*, William C. Y. Lee, McGraw Hill 1989.

In digital mode, MMSS 1 is performing digital call processing using a CDMA modulation format. In digital or CDMA mode operation user information is provided to CDMA modulation and demodulation and processing circuitry 4 which modulates the user information in accordance with an analog format and provides the modulated data to transceiver 3. Transceiver 3 upconverts and amplifies the signal and broadcasts the signal through antenna 5.

Data is received in CDMA mode operation by MMSS 1 by antenna 5 and provided to transceiver 3 where it is downconverted and amplified and provided to CDMA modulation and demodulation and processing circuitry 6, where the signal is demodulated in accordance with an analog format and provided to the user of MMSS 1. The design and implementation of CDMA modulation and demodulation and processing circuitry 6 is described in detail in the aforementioned U.S. Pat. Nos. 4,901,307 and 5,103,459.

Note that when MMSS 1 is in the system determination substate it may be temporarily in neither analog mode nor CDMA mode. This is not considered a separate mode, but rather is considered a transition state.

In the exemplary embodiment, the first thing that system determination processor 8 does after completion of power-up is to retrieve the system preference parameters from nonvolatile (NV) memory element 14. System determination processor 8 selects the preferred system for acquisition in accordance with the retrieved system preference parameters. Another circumstance under which system determination processor 8 will retrieve the system preference parameters from nonvolatile memory element 14 is when the exit reason from analog mode or CDMA mode indicates that system preference parameters have changed.

In the exemplary embodiment, system determination processor 8 retrieves one of the following preferred operational mode parameters from nonvolatile memory element 14:

a. CDMA preferred;
b. CDMA only;
c. analog preferred; or
d. analog only.

If MMSS 1 is to operate in a CDMA preferred mode, then system determination processor 8 retrieves one of the following user preferences from system preferences table 12:

a. A system only
b. A system preferred
c. B system only
d. B system preferred
e. Home system identification (SID) only
f. Specific SID(s) to acquire only In the exemplary embodiment, nonvolatile memory element 14 is implemented using a programmable read only memory. Typically, the A system uses a different carrier frequency than the B system. When system determination processor 8 selects a system upon which to attempt acquisition it provides the carrier frequency information to transceiver 3, which attempt acquisition in accordance with the carrier frequency information.

The system identification (SID) parameters, specify a group of cells for a selected serving system. The cell-sites of one serving system in a specified geographic area will have a different SID number than the cell-sites of a different serving system in the same geographic area. The cell-sites of one serving system in a specified geographic area will also have a different SID number than the cell-sites of the same serving system in a different geographic area.

If the user of MMSS 1 wishes to restrict the cell-sites that MMSS 1 is able to access, in order to reduce the incurred roaming charges, the Home SID option is used, which restricts service to a particular area. If, on the other hand, the user of MMSS 1 wishes to be able to use MMSS 1 in a selected set of areas, then a list of specific SIDs to acquire may be provided. IN the exemplary embodiment, when MMSS 1 operates in an analog preferred mode, system determination processor 8 obtains user preferences from the same set of user preferences as specified above.

System determination processor 8 builds a local preferences lookup table in sorted order in accordance with system preferences from NV memory element 14. This table is stored in system preferences table 12. System determination processor 8 uses system preferences table 12 to select the next system upon which to attempt acquisition. In the exemplary embodiment, system preferences table 12 is rebuilt when and if the preferred system has been changed by the user.

System determination processor 8 builds a channel lookup table for CDMA channel acquisition decisions, in accordance with system preferences from system preferences table 12 and frequencies associated with each system stored in nonvolatile memory 14. The table is built according to available primary and secondary channels for system A and system B. The table is built on power-up and re-sorted based on the acquired CDMA channel during online operation. In the exemplary embodiment, there is a separate table for system A and a separate table for system B, not shown. These tables are stored in CDMA channel table 10. In the exemplary embodiment, CDMA channel table 10 is implemented in a random access memory (RAM) element.

As a general rule, system determination processor 8 does not indicate to the entered mode the exit reason from the previous mode. The operational hardware, analog modulation and demodulation and processing circuitry 4 or CDMA modulation and demodulation and processing circuitry 6, is only provided with the information necessary to perform acquisition. The data necessary to perform acquisition are referred to as entry mode parameters. When an analog service is exited analog modulation and demodulation and processing circuitry 4 provides exit parameters to system determination processor 8. Similarly, when a CDMA service is exited CDMA modulation and demodulation and processing circuitry 6 provides exit parameters to system determination processor 8.

The possible reasons for entering analog mode are:

1. The preferred mode is analog only;
2. The preferred mode is CDMA preferred, and CDMA acquisition has failed;
3. Hand-off from CDMA to analog; or
4. An origination command is received while attempting to acquire a CDMA system. (the CDMA acquisition attempt is aborted) and there is an indication that service is currently available on an analog system. An origination command is a command indicating that the user of MMSS 1 is initiating a call or service.

System determination processor 8 provides analog entry mode parameters to analog modulation and demodulation and processing circuitry 4, which includes an entry reason. Entry reasons include:

1. Regular acquisition entry in which a full acquisition sequence is conducted including pilot signal acquisition and synchronization channel acquisition;
2. Resume analog operation in which a faster acquisition attempt is conducted based upon a previous acquisition of the same system;
3. CDMA to analog hand-off;
4. Origination entry in MMSS 1 attempts acquisition on a non preferred system in order to reduce the acquisition time (for example, MMSS 1 is attempting to acquire a CDMA system when an origination command is received. MMSS 1 will abort the attempt to acquire the preferred CDMA system and perform acquisition upon the system upon which it has previously had service; and
5. Analog voice channel assignment from CDMA in which the CDMA base station directs MMSS 1 to an analog channel for continuing service.

System determination processor 8 provides analog entry mode parameters to analog modulation and demodulation and processing circuitry 4 and transceiver 3, which in response set up and perform the call in analog mode.

For regular acquisition and resume analog operation entries, system determination processor 8 provides the following analog entry mode parameters to analog modulation and demodulation and processing circuitry 4:

1. System to acquire (system A, system B, home SID, or preselected acquisition SIDs).

2. Ignore CDMA global action message (GAM) indication. In the exemplary embodiment, if the GAM is set to 'true', this indicates that the CDMA Capability Global Action Message should be ignored.

3. Idle Timeout. If enabled, analog mode element 4 returns control to system determination 8 after a predetermined time duration while in the idle state.

For CDMA to analog hand-off entry, system determination processor 8 provides the following analog entry mode parameters to analog modulation and demodulation and processing circuitry 4:

1. SID to acquire,
2. Voice mobile attenuation code (VMAC).
3. Analog voice channel number,
4. SAT color code (SCC),
5. Message encryption mode, and
6. Voice channel substate to enter (i.e., Waiting For Order, Waiting for Answer or Conversation).

For origination entry, system determination processor 8 specifies the following analog entry mode parameters to analog modulation and demodulation and processing circuitry 4:

1. System to acquire (system A, system B, home SID or acquisition SIDs) and
2. The called address to originate.

For analog voice channel assignment from CDMA, system determination processor 8 specifies the following analog entry mode parameters to analog modulation and demodulation and processing circuitry 4:

1. SID to acquire,
2. Voice mobile attenuation code (VMAC),
3. Analog voice channel number,
4. SAT color code (SCC),
5. Message encryption mode, and
6. Voice channel processing to perform (i.e., origination or page response).

When MMSS 1 exits analog mode and analog modulation and demodulation and processing circuitry 4 provides exit parameters to system determination processor 8. Control returns to system determination processor 8 from analog modulation and demodulation and processing circuitry 4 whenever system determination is to be performed again, and returns with an analog exit reason. In the exemplary embodiment, possible analog exit reasons include:

1. Normal exit—Call has ended, either normally or because of a fade condition on the voice channel ("voice fade");
2. Acquisition failed—The indicated system (A or B or specified SID) could not be acquired;
3. Acquisition terminated—Acquired SID does not match the specified SID(s) acceptable for acquisition;
4. Acquisition aborted—Origination command has been received while attempting to acquire the analog system;
5. Acquisition lost—Fade condition occurred on the paging channel ("idle fade");
6. CDMA Available—CDMA Capability Global Action Message was received with the CDMA_AVAIL bit set;
7. Idle timeout has expired;
8. Preferred system has been changed;
9. NAM has been changed;
10. Offline command has been received; and
11. Reset or Power-down command has been received.

Control is passed from system determination processor 8 to CDMA modulation and demodulation and processing circuitry 6 if:

1. The preferred mode is CDMA only;
2. The preferred mode is analog preferred and analog acquisition has failed; or
3. An origination command is received while attempting to acquire analog (the analog acquisition attempt is aborted) and there is an indication that service is currently available on a CDMA system.

When CDMA mode is entered system determination 8 provides an entry reason to CDMA mode element 6. In the exemplary embodiment, possible CDMA entry reasons include:

1. Regular acquisition entry;
2. Resume CDMA operation (no changes); and
3. Origination entry.

For regular acquisition entry, system determination 8 provides the following CDMA entry mode parameters:

1. System to acquire (system A, system B, home SID, or acquisition SIDs);
2. CDMA channel to acquire;
3. Idle Timeout—If enabled, CDMA mode returns control to system determination 8 after it has exceeded this timeout while in the idle state;
4. CDMA locked indicator—Indicates if a lock order was previously received; and
5. New mode or serving-system indicator, which indicates if MMSS 1 was previously operating in analog mode or in a different CDMA serving-system.

For resume CDMA operation entry, system determination processor 8 provides the following CDMA entry mode parameter:

1. CDMA channel to acquire (primary or secondary).

For origination entry, system determination processor 8 provides the following CDMA entry mode parameters:

1. System to acquire (system A, system B, home SID or acquisition SIDs);
2. CDMA channel to acquire; and
3. The called address to originate.

Control returns to system determination processor 8 from CDMA modulation and demodulation and processing circuitry 6 with an exit reason whenever system determination is to be performed again. In the exemplary embodiment, CDMA exit reasons include:

1. Normal exit—Call has ended, either normally or because of loss of traffic channel acquisition;
2. Acquisition failed—The indicated system (A or B or specified SID) could not be acquired;
3. Acquisition terminated—Acquired SID does not match the specified SID(s) acceptable for acquisition;
4. Acquisition Lost—Any time after successful initial acquisition of the indicated system, acquisition has been lost ("idle fade"). For purposes of this design, loss of acquisition includes all error conditions which would cause exit back to system determination, including unsupported channel assignment, expiration of acknowledgment timeouts, too many bad frames, and so forth;
5. Acquisition aborted—Origination command received while attempting to acquire CDMA system;
6. CDMA to analog hand-off indication has been received;
7. Origination in analog indication has been received;
8. Page response in analog indication has been received;
7. Lock order has been received;
9. Incompatible protocol revision indication has been received;
10. Idle timeout has expired;
11. Preferred system has been changed;
12. NAM has been changed;
13. Offline command has been received; and
14. Reset or power-down command has been received.

The exemplary embodiment complies fully with the rules of the industry standards and provides optimized performance in a multi-mode environment.

The discussion which follows is based on the existence in MMSS 1 of a preferred mode (analog preferred or CDMA preferred, as opposed to analog only or CDMA only) and a preferred serving-system (A then B or B then A, as opposed to A only or B only). In the exemplary implementation, there exist two CDMA frequencies (primary and secondary) as opposed to just one. The implementation operates with options for all conditions to illustrate the selection method performed by the apparatus of the present invention.

The use of two options is designed to provide clear and simple illustration. It should be noted that the techniques employed for dual-mode are easily expanded to multi-mode operation. If MMSS 1 is configured to have only one mode, or one serving-system, or one CDMA frequency, then the appropriate system determination step is skipped. Similarly, if there is more than two serving systems, then the decision criteria need only reflect the additional consideration of one more possible serving system. Listed below is a superset of all possibilities in a system of two possible modes, two possible serving systems and two possible CDMA frequencies.

System determination processor 8 determines the mode and serving-system according to the following priorities, from highest to lowest:

1. Preferred mode using the preferred serving system;
2. Non-preferred mode using the preferred serving system;
3. Preferred mode using the non-preferred serving system; and
4. Non-preferred mode using the non-preferred serving system.

So, for example, if the preferred mode is CDMA and the preferred serving system is B, then the priority is CDMA-B, analog-B, CDMA-A, analog-A. Every time control returns to system determination processor 8 for a reason that requires re-acquisition, system determination processor 8 starts with the system of the highest priority.

In the case of CDMA acquisition, system determination processor 8 directs initial acquisition on the primary channel first, followed by the secondary channel if acquisition on the primary channel fails. CDMA acquisition is performed by MMSS 1 acquiring a pilot channel which is a signal broadcast by a base station which provides coarse timing synchronization information to MMSS 1. After acquiring the pilot channel, MMSS 1 acquires the synchronization channel for fine timing synchronization and at this point MMSS 1 is ready to conduct service on allocated voice data channels. Once acquisition succeeds, then the first channel acquired (primary or secondary) is the one maintained for all subsequent CDMA acquisitions until:

1. CDMA pilot acquisition fails;
2. MMSS 1 is reset (either via regular powerdown/powerup cycle or via soft reset after exit from offline state); or
3. The preferred system (A/B and/or CDMA/Analog) has changed.

The entry reasons specified previously indicated a number of acquisition arguments including "idle timeout" and "Ignore CDMA GAM". System determination processor 8 specifies these arguments as follows. The idle timeout is disabled when system determination processor 8 selects the preferred system for acquisition (preferred mode using the preferred serving system), the timeout is otherwise enabled. When the idle timeout is enabled this forces control to return to system determination processor 8 at periodic intervals in order to attempt an acquisition on the preferred system.

If the preferred mode is CDMA and system determination 8 passes control to analog modulation and demodulation and processing circuitry 4, then the ignore CDMA Capability GAM indicator is disabled. Note that this indicator is only utilized when operating in analog mode. Analog mode then returns to system determination processor 8 per the normal rules and, also, if the CDMA_AVAIL bit is set in a received CDMA Capability GAM. If the preferred mode is analog, then system determination processor 8 always enables the ignore CDMA GAM indicator. This causes analog modulation and demodulation and processing circuitry 4 to ignore the CDMA Capability GAM.

Figure 2A:
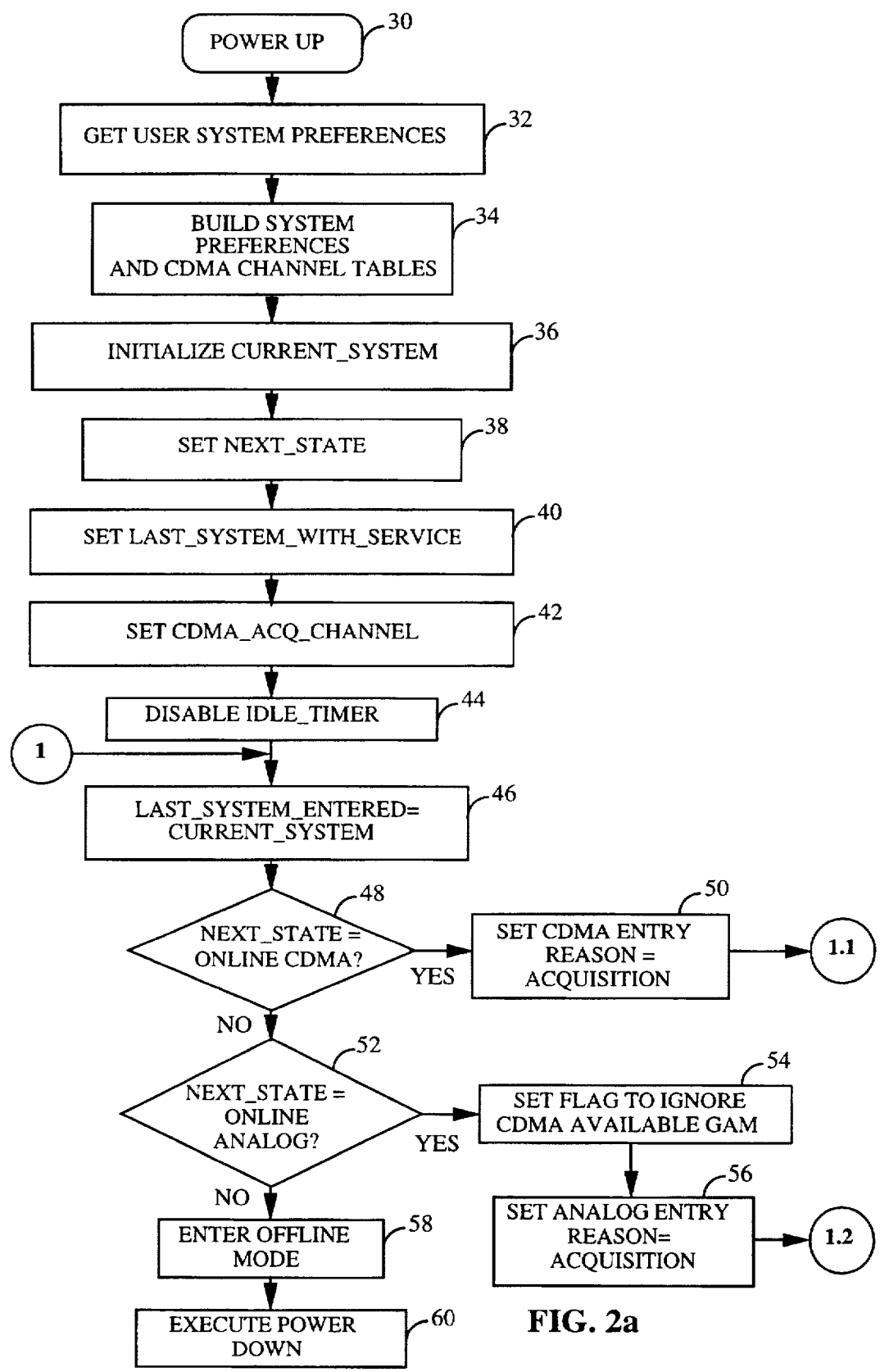
FIGS. 2a-s are a flow diagram for describing the operation of the present invention.
Figure 2B:
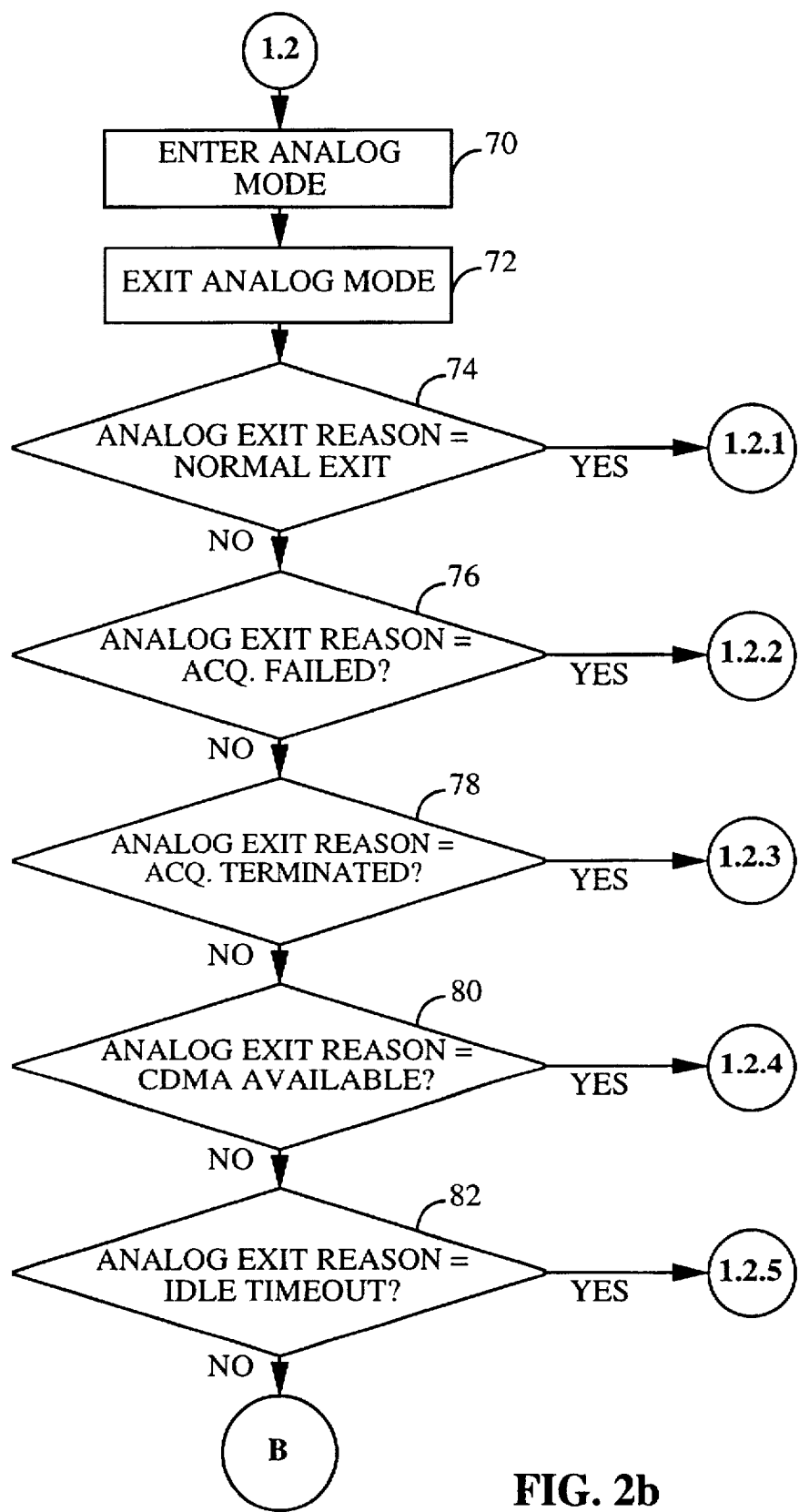
Figure 2C:
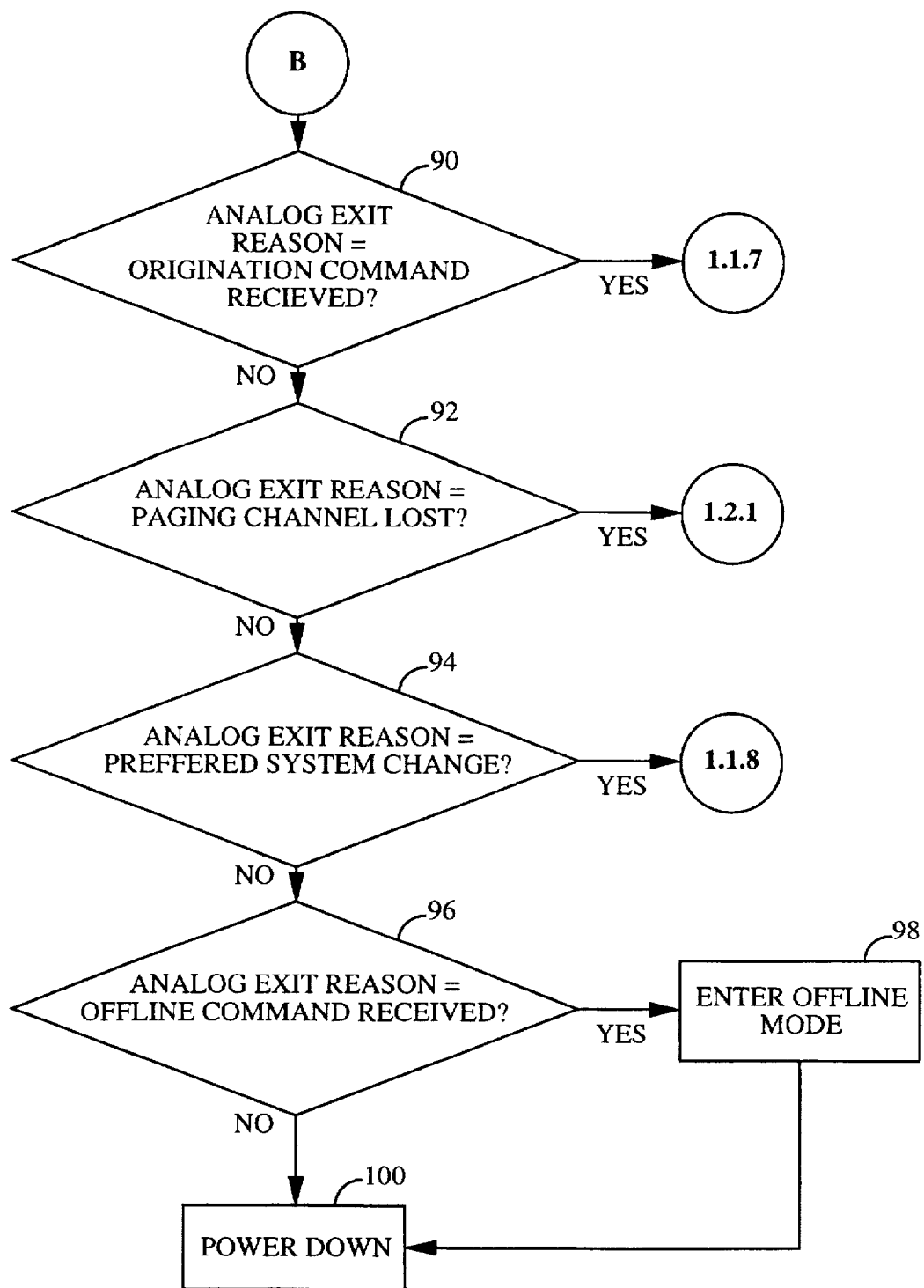
Figure 2D:
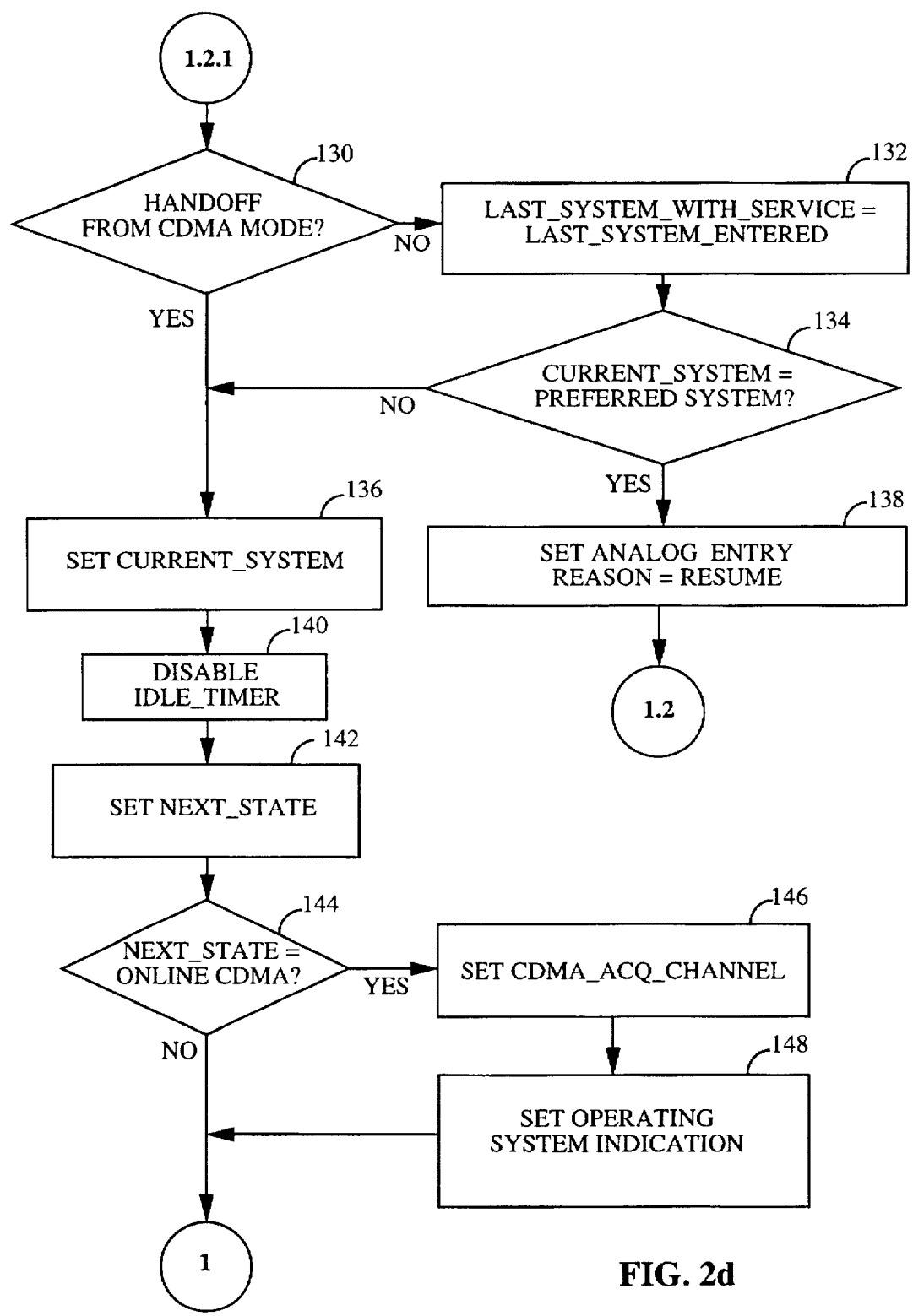
Figure 2E:
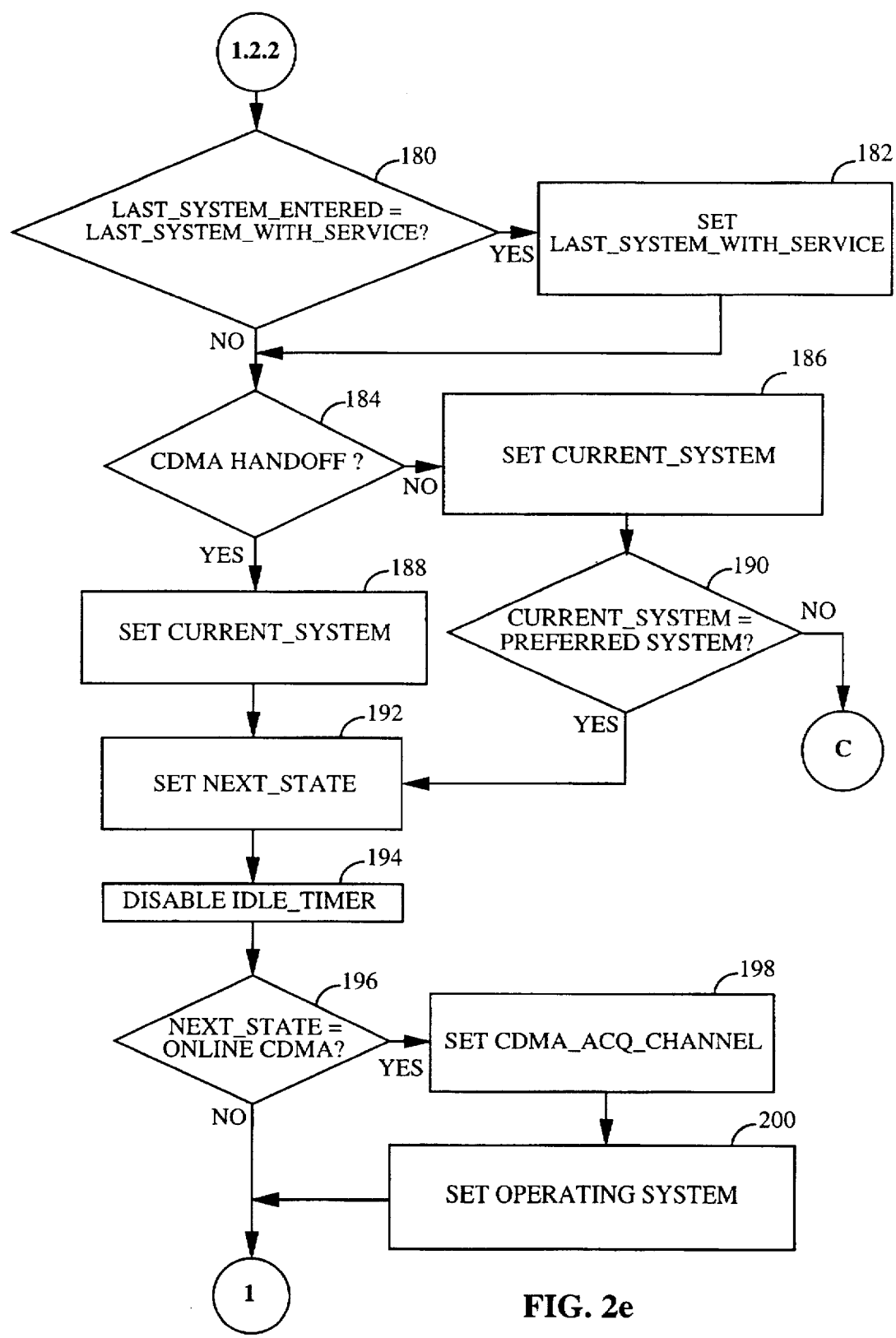
Figure 2F:
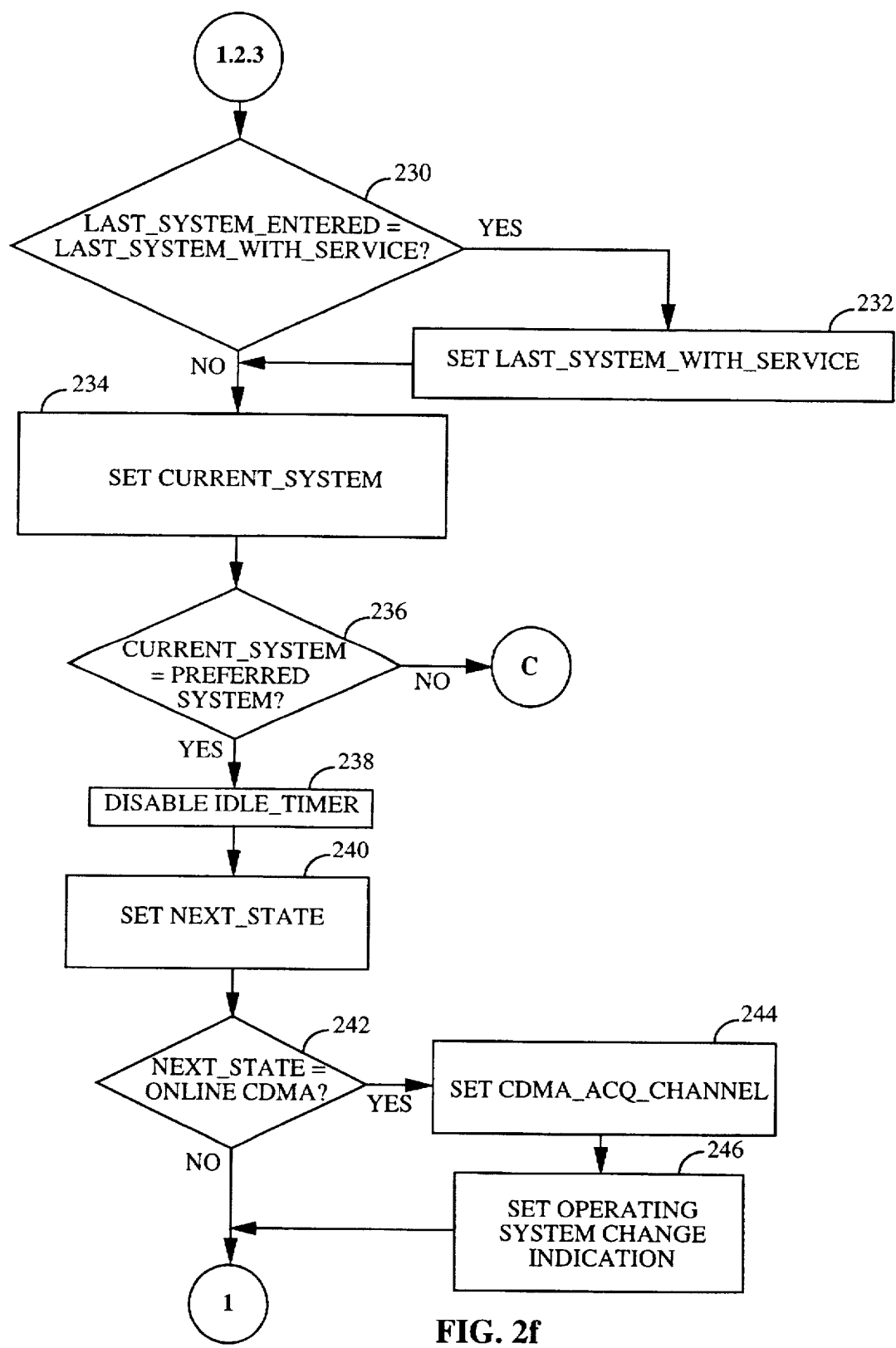
Figure 2G:
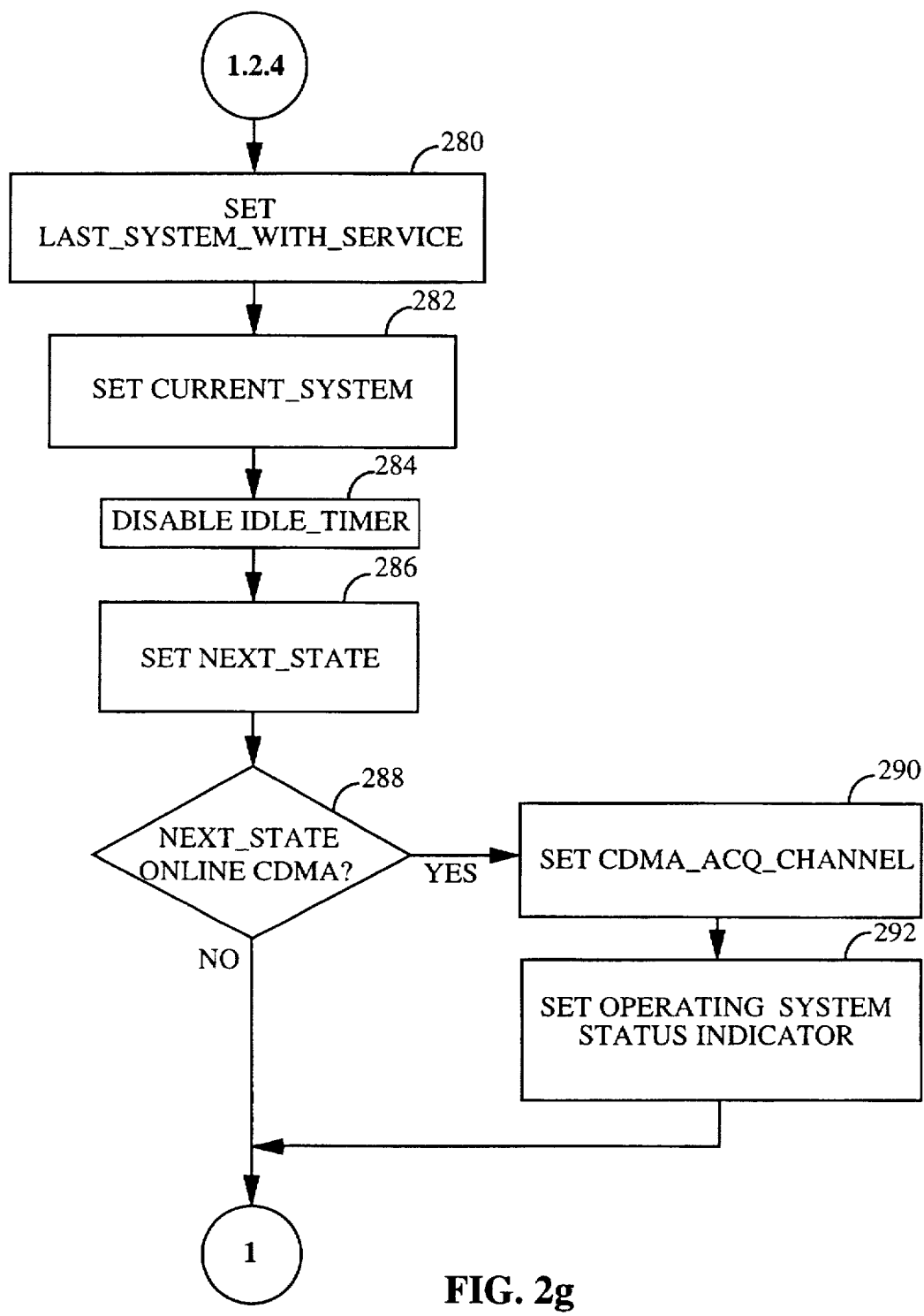
Figure 2H:
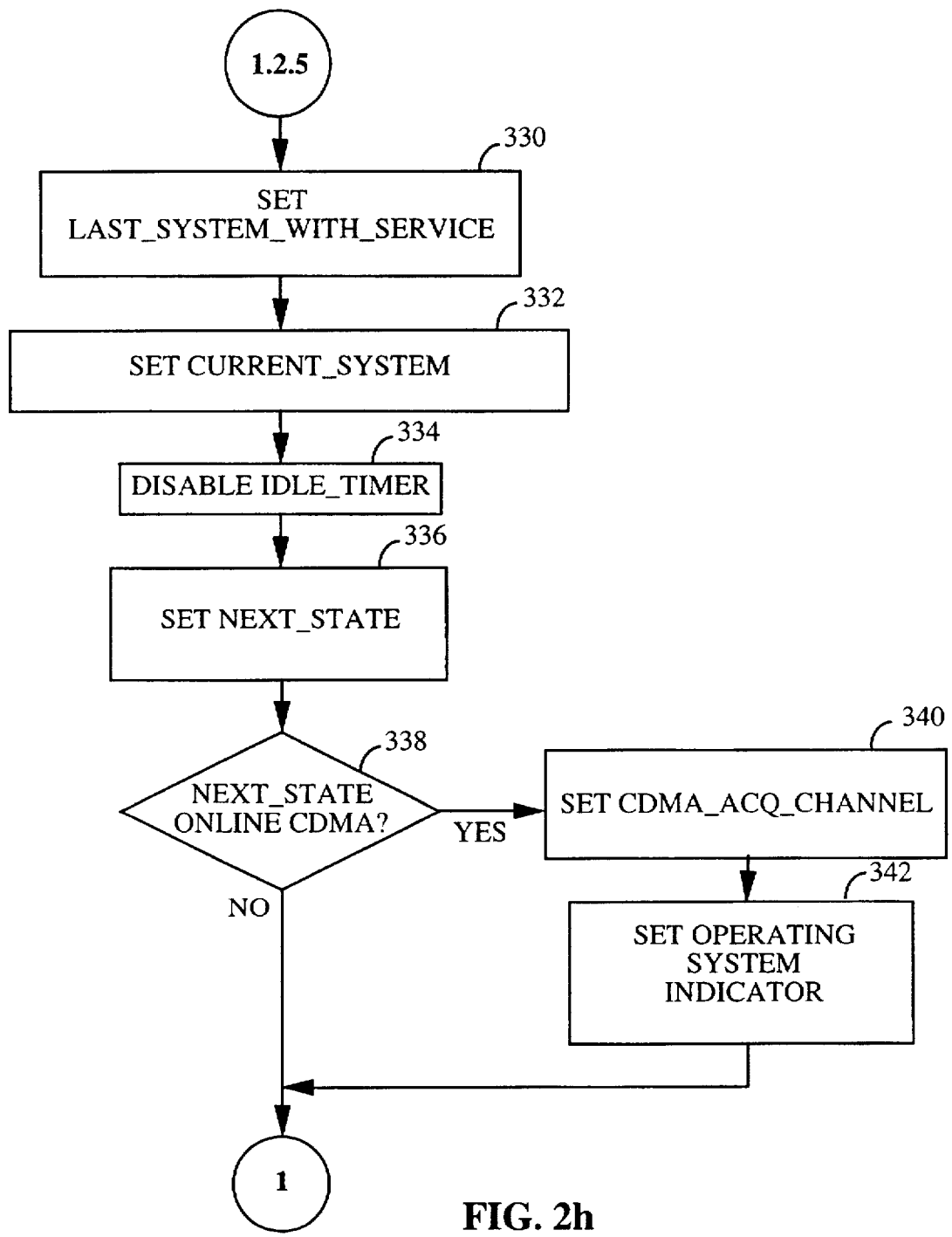
Figure 2I:
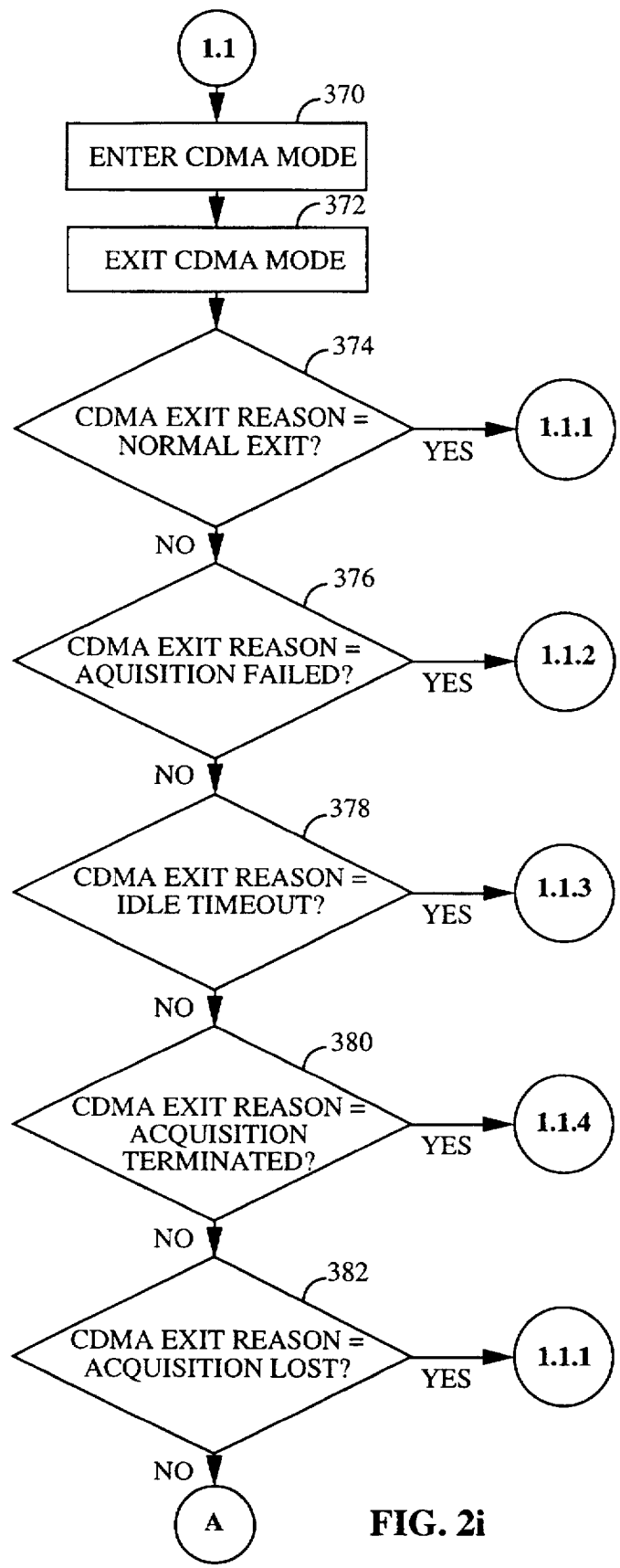
Figure 2J:
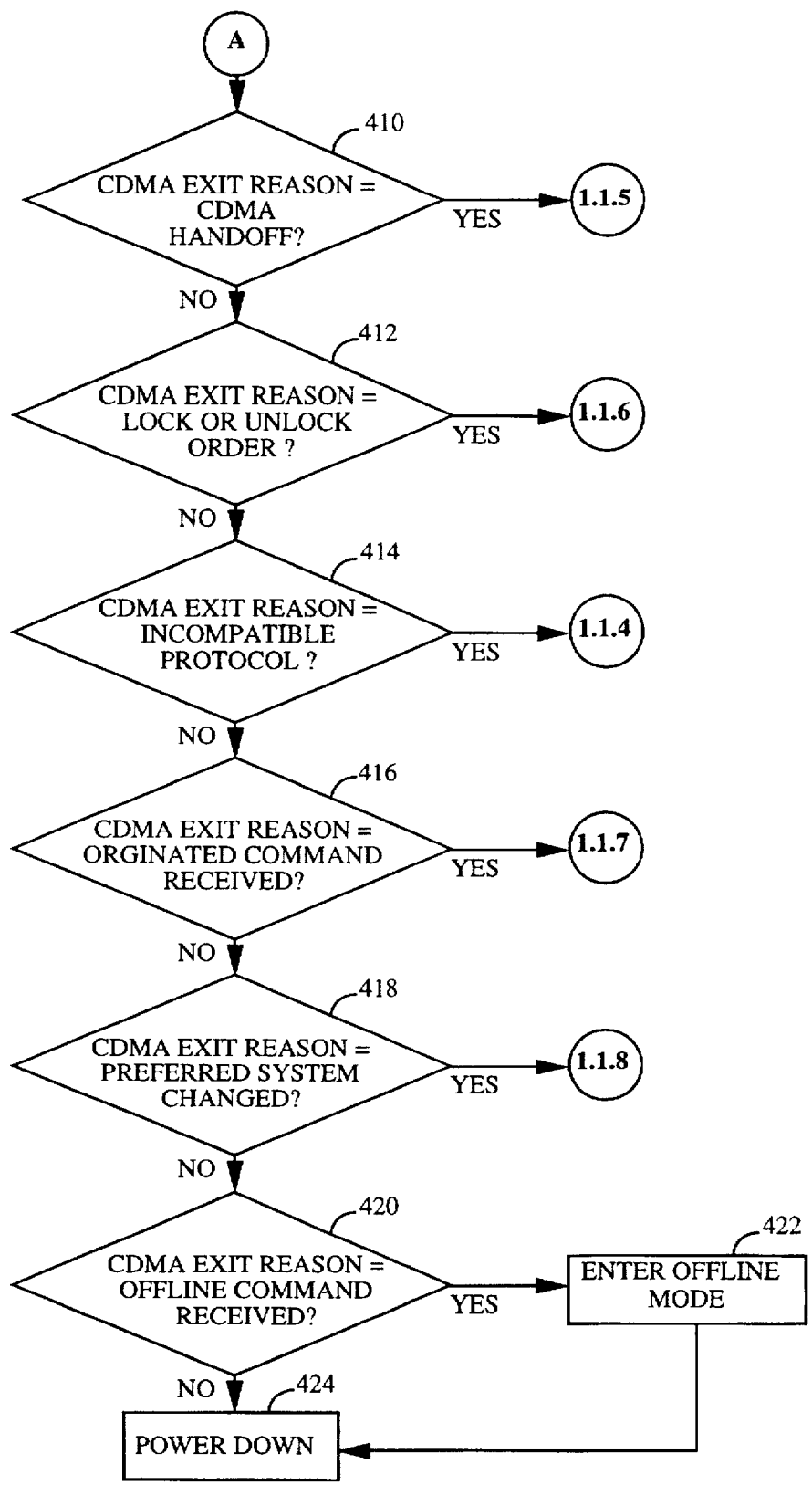
Figure 2K:
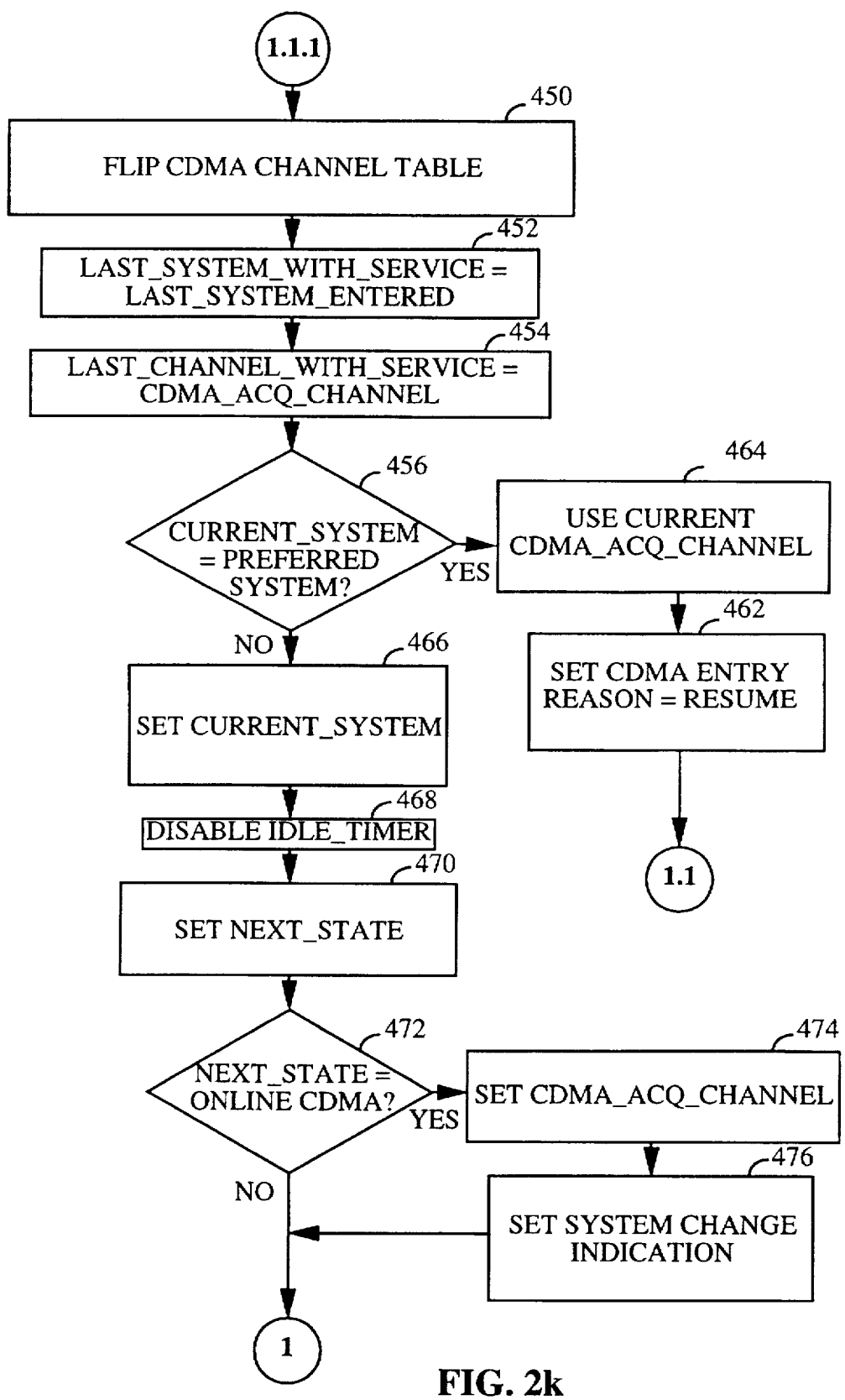
Figure 21:
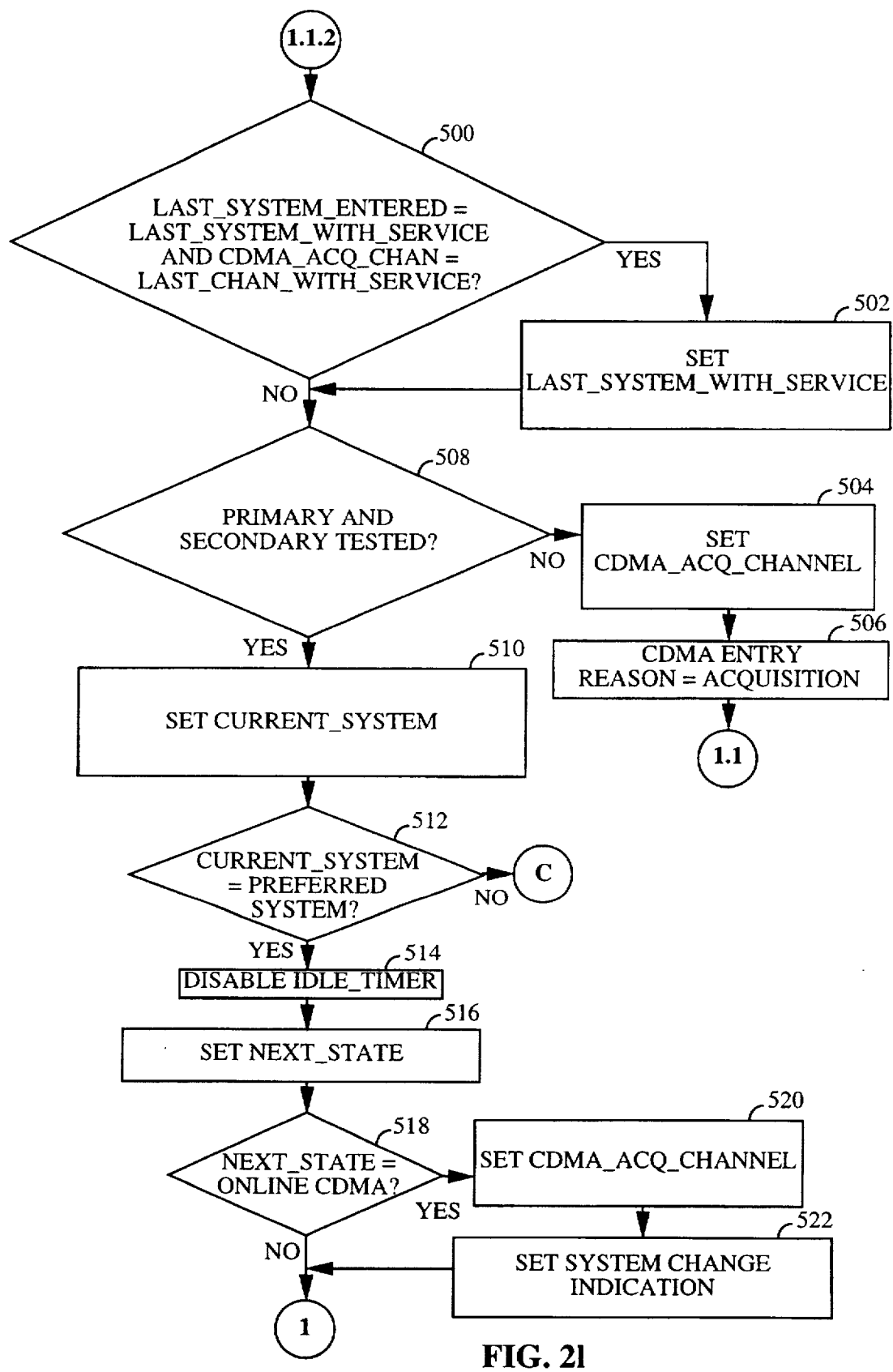
Figure 2M:
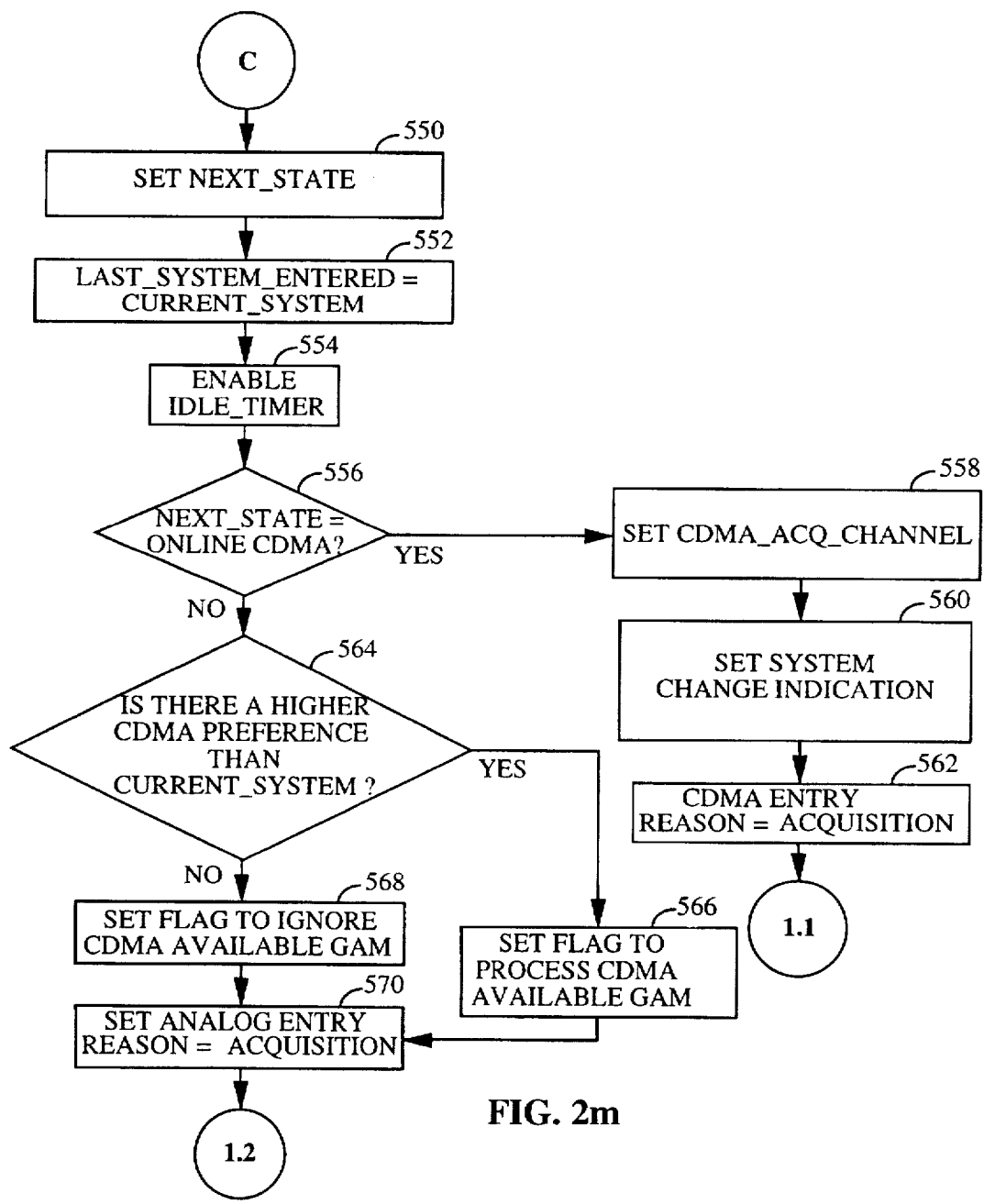
Figure 2N:
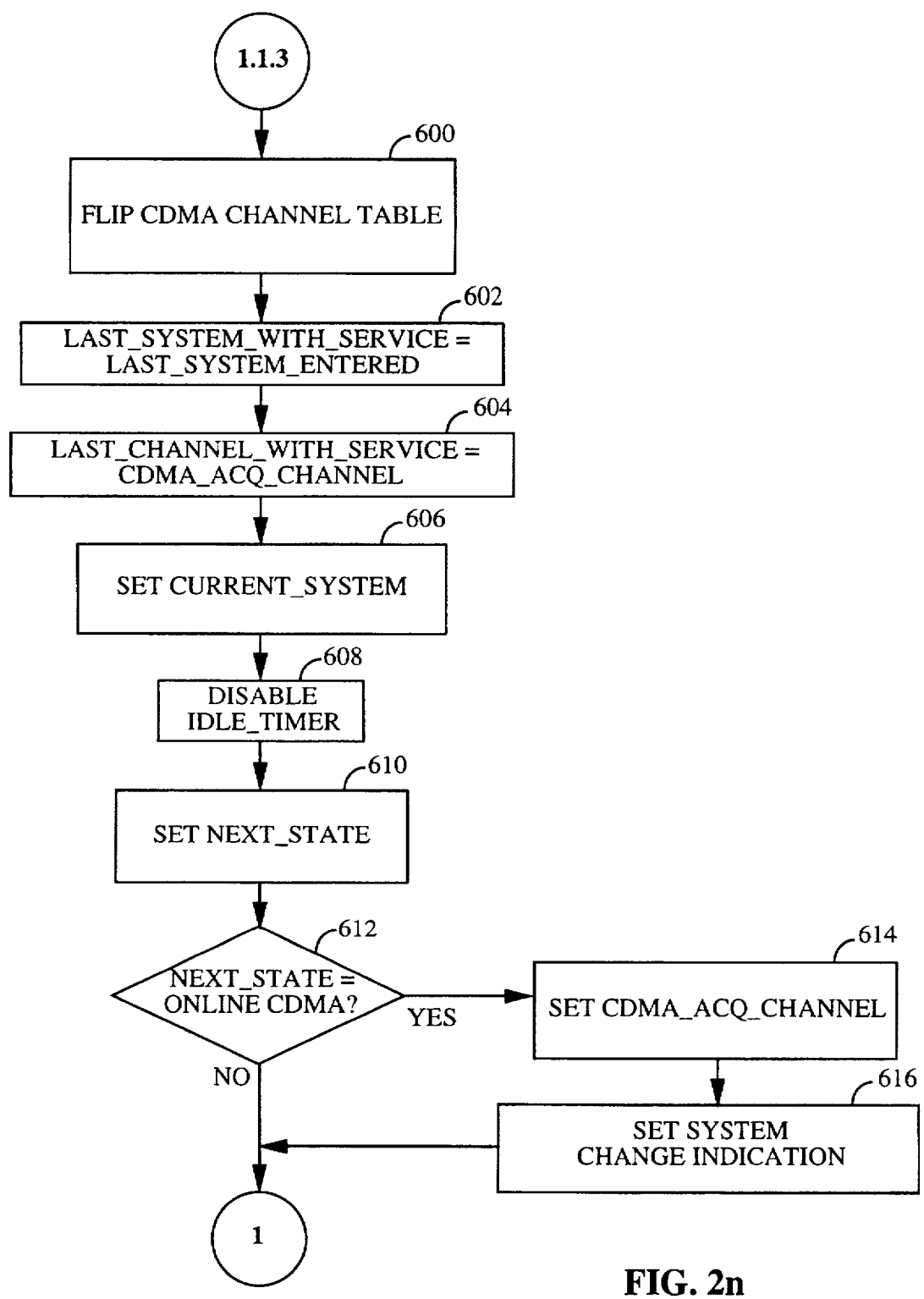
Figure 2O:
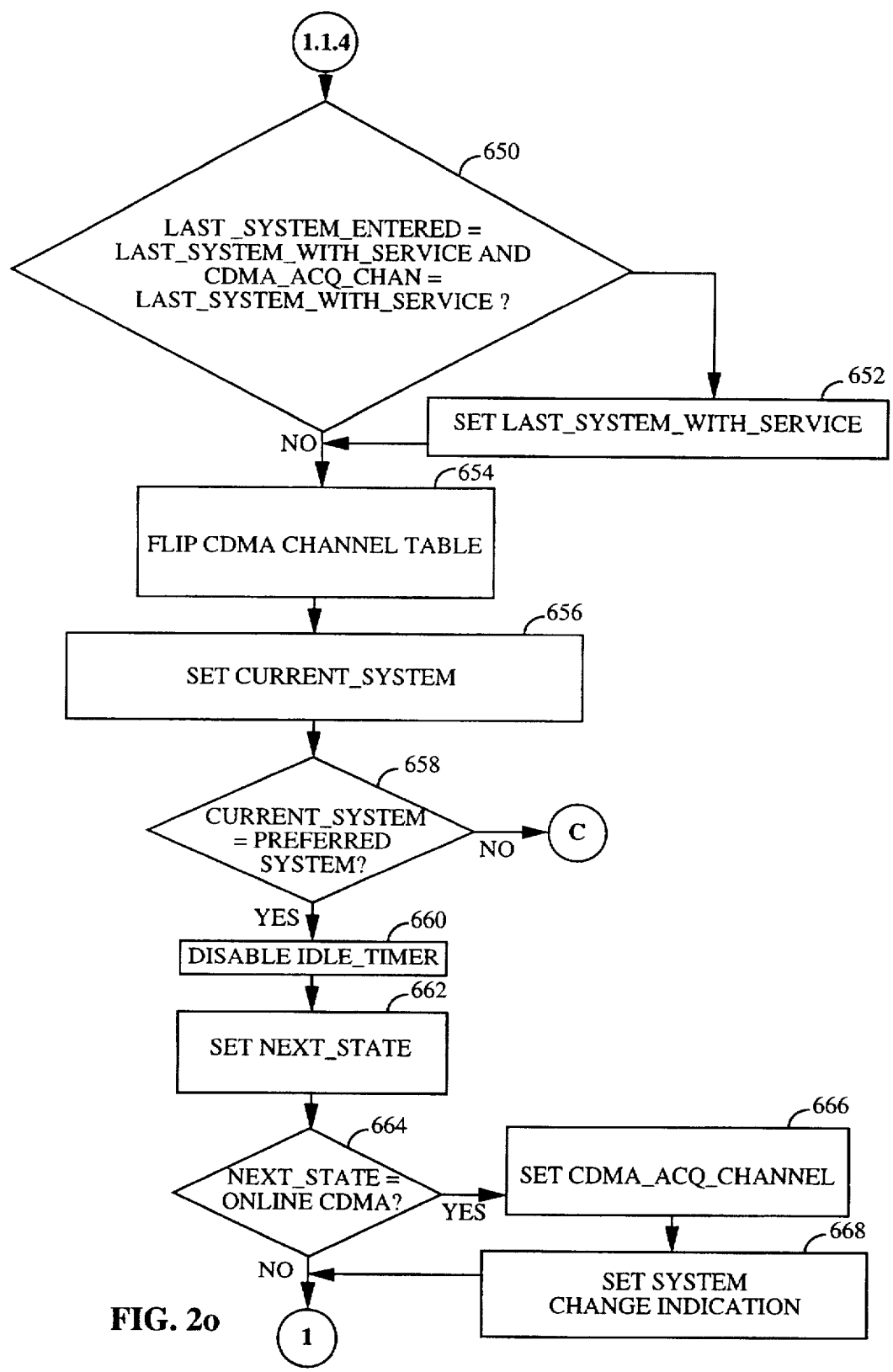
Figure 2P:
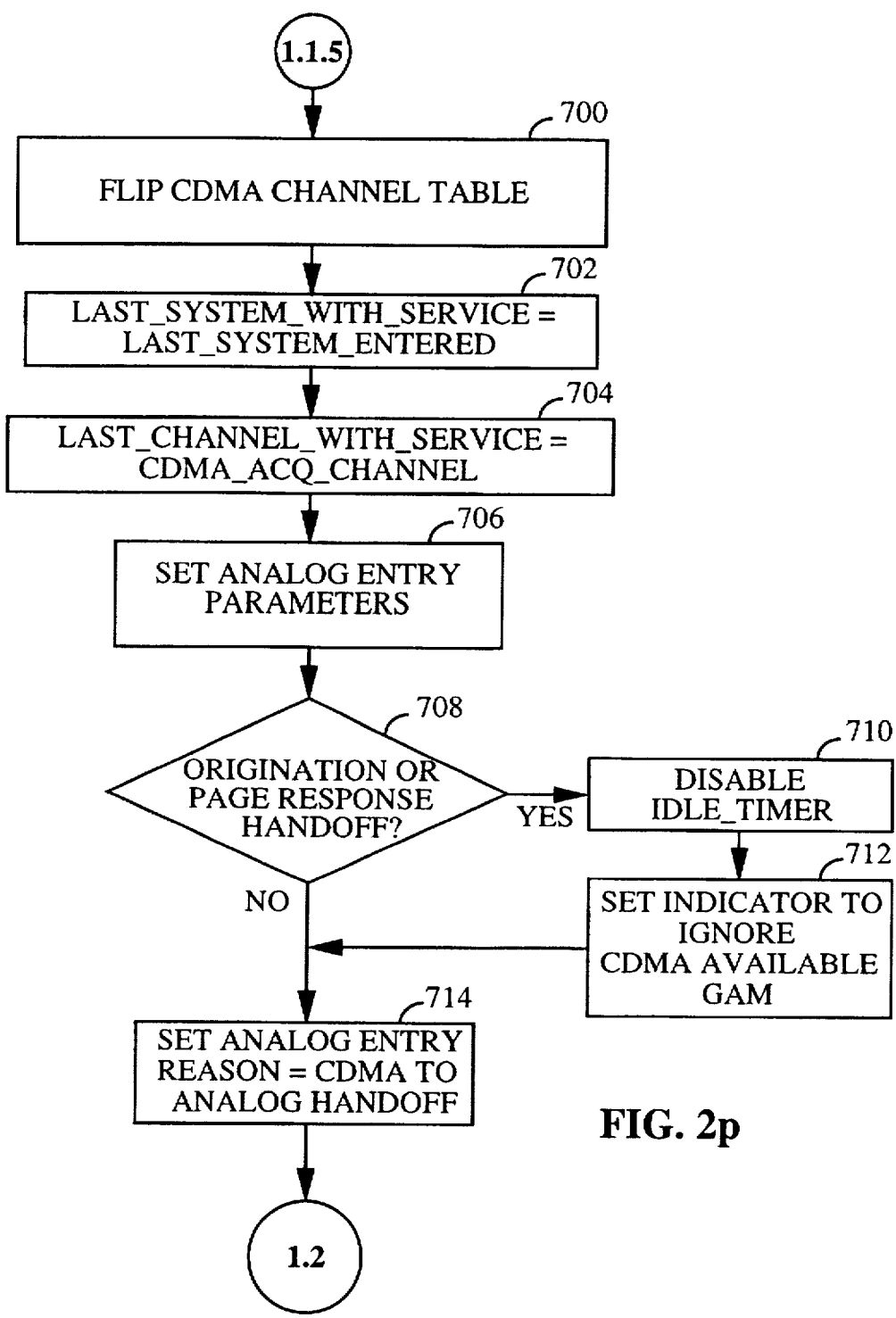
Figure 2Q:
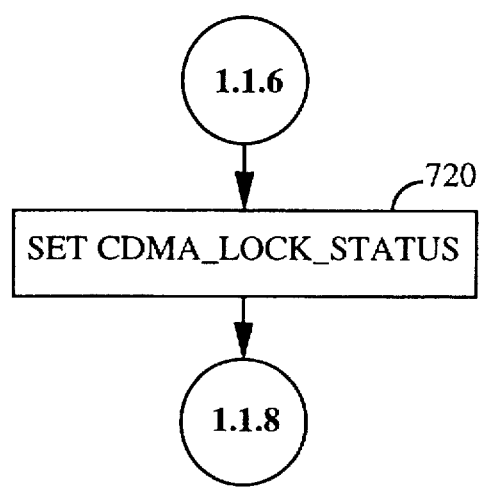
Figure 2R:
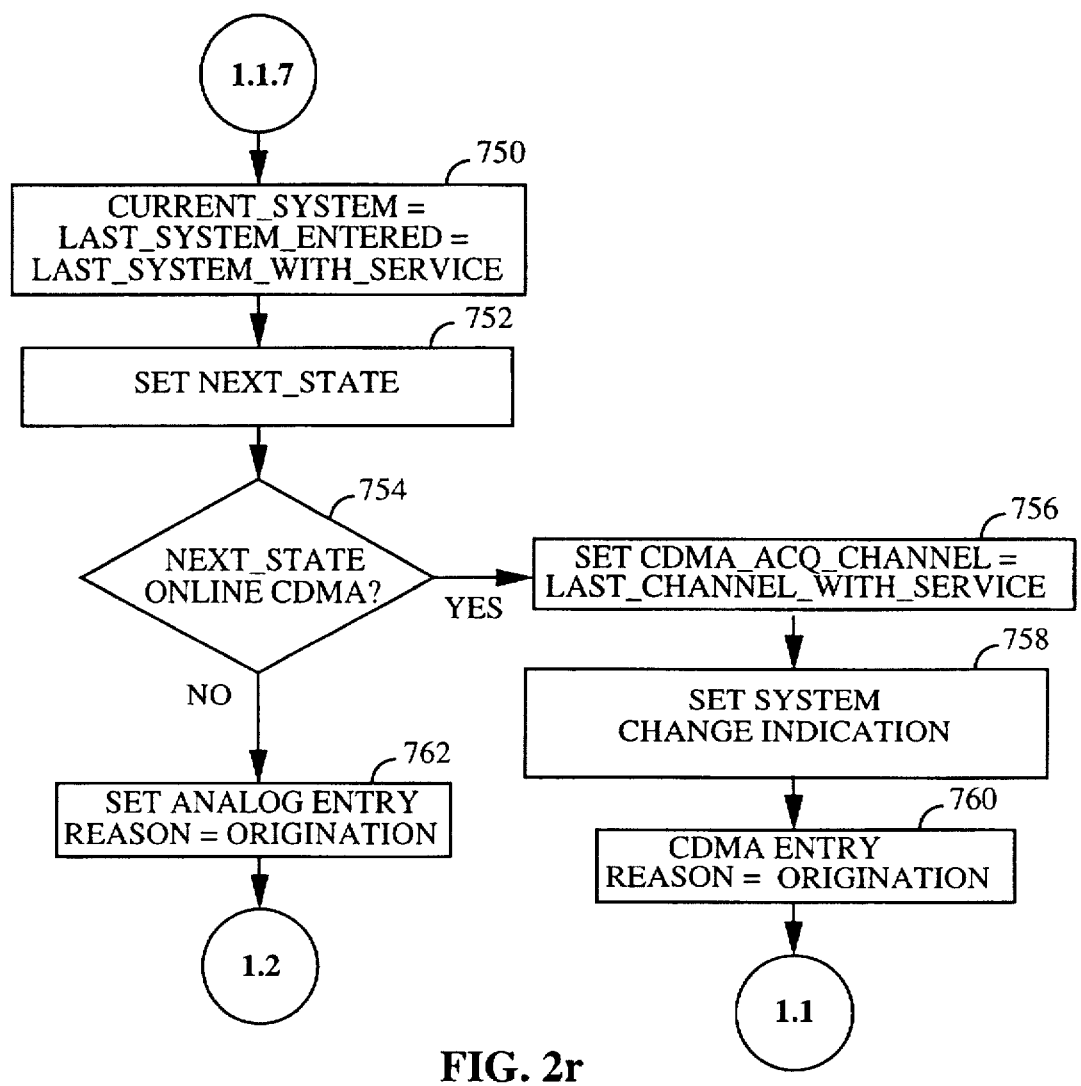
Figure 2S:
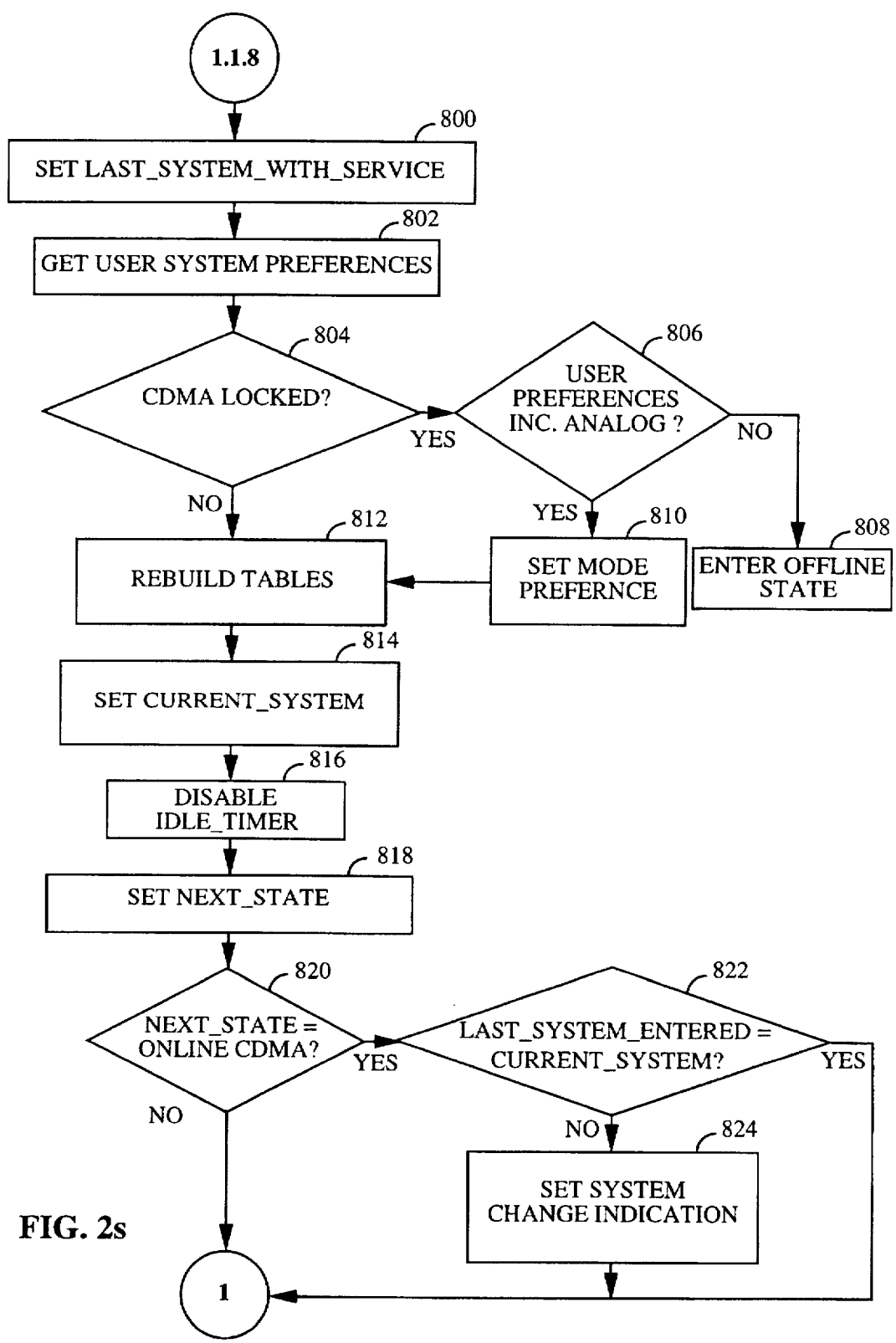

Referring now to FIG. 2a–s, the following set of variables and terms are used in the flow diagrams to illustrate the operation of the system determination method of the present invention:

1. System preferences table—Holds user system acquisition preferences sorted in order from highest to lowest priority;
2. CDMA channel table—Holds CDMA acquisition channels with sorting based on acquired channel during online operation. In the exemplary embodiment, there are separate tables for system A and system B (not shown);
3. CURRENT_SYSTEM—The system (mode and serving system) at the current table index location in the system preferences table 12;
4. NEXT_STATE—Current state (online or offline) and operating mode (CDMA or analog);
5. LAST_SYSTEM_WITH_SERVICE—Indicates system (mode and serving system), if any, where service is currently available;
6. CDMA_ACQ_CHANNEL—Current CDMA acquisition channel (primary or secondary) at the current table index location in the CDMA channel table 10;
7. LAST_SYSTEM_ENTERED—The system (mode and serving system) where the last acquisition attempt was made; and
8. NEW_MODE_OR_SYS—Indicator for CDMA mode whether the mobile station was previously operating in a different mode or serving system (utilized for CDMA registration processing).

In block 30, MMSS 1 is powered up thereby initializing the operation of system determination processor 8. Proceeding to block 32, system determination processor 8 gets the user system preferences from memory 14. In block 34, system determination 8 builds system preferences and CDMA channel tables and stores them into system preferences table 12 and CDMA channel table 10, respectively.

In block 36, system determination processor 8 sets the CURRENT_SYSTEM to the top entry in system preferences table 12 so that MMSS 1 will first attempt to acquire the system using the preferred mode (Analog or CDMA) and the preferred serving system (A or B). In block 38, system determination processor 8 sets the variable NEXT_STATE in accordance with value of the variable CURRENT_SYSTEM, i.e. NEXT_STATE will be set to online CDMA or online analog. In block 40, system determination processor 8 sets LAST_SYSTEM_WITH_SERVICE to indicate no service is available, because MMSS 1 has just powered up and no acquisition attempt has yet been performed.

In block 42, system determination processor 8 sets CDMA_ACQ_CHANNEL to the top entry in CDMA channel table 10. Because an acquisition attempt has not yet been performed CDMA_ACQ_CHANNEL will be set to the primary CDMA channel for the preferred serving system A or B. In block 44, the IDLE_TIMER (not shown) is disabled, because the initial acquisition attempt will be directed toward the preferred system. In the exemplary embodiment, the IDLE_TIMER is a counter within system determination processor 8 which keeps track of the time periods between checking whether the preferred system is available. The flow proceeds to block 46, in which the variable LAST_SYSTEM_ENTERED is set to CURRENT_SYSTEM.

The flow proceeds to control block 48 where NEXT_STATE is tested to determine if it is online CDMA. If NEXT_STATE is not online CDMA, the flow proceeds to block 52. Control block 52 tests if NEXT_STATE is online analog. If NEXT_STATE is not online analog, then in block 58 system determination processor 8 tells the MMSS 1 to enter offline mode, then in block 60 MMSS 1 powers down.

If in block 52, the NEXT_STATE variable is online analog, then the flow proceeds to block 54, which sets a flag to indicating to system determination processor 8 that the CDMA Capability Global Action Message (GAM) should be ignored, because acquisition is being attempted using the preferred system. Proceeding to block 56, system determination processor 8 sets the analog entry reason to acquisition. The flow then proceeds to block 70 and control is passed to analog modulation and demodulation and processing circuitry 4. Upon exit from analog mode, control is returned to system determination processor 8, accompanied by the analog exit parameters provided by analog modulation and demodulation and processing circuitry 4.

Blocks 74-96 are control blocks which examine the exit reason provided by analog modulation and demodulation and processing circuitry 4. Block 74 tests if the analog exit reason is a normal exit. If it is determined that the control has returned to system determination processor 8, because of a normal exit, then the flow proceeds to block 130. In block 130, system determination processor 8 checks if the reason that analog mode was previously entered was due to a CDMA-to-analog hand-off.

If the reason for operation in analog mode was not a hand-off from CDMA mode, then the flow proceeds to block 132. In block 132, the variable LAST_SYSTEM_WITH_SERVICE is set to LAST_SYSTEM_ENTERED. Because this was a "Normal Exit" from analog mode system determination processor knows that MMSS 1 was able to successfully acquire service on the analog system specified by LAST_SYSTEM_ENTERED. The flow then proceeds to control block 134 which tests if the variable CURRENT_SYSTEM is set to the preferred system. If the variable CURRENT_SYSTEM is the preferred system, then system determination processor 8 sets the analog entry reason to resume, meaning the analog system exited should be re-acquired, and control is again passed to the analog modulation and demodulation and processing circuitry 4 in block 70.

If the variable CURRENT_SYSTEM is not the preferred system or if analog mode was previously entered due to a CDMA-to-analog hand-off the flow proceeds to block 136 which sets the variable CURRENT_SYSTEM to the entry at the top of the system preferences table 12, so that the next acquisition attempt will be made on the preferred system. The flow then proceeds to block 140, where the idle timer is disabled, since acquisition will be attempted on the preferred system. Then in block 142, the variable NEXT_STATE is set a value based on the value of the variable CURRENT_STATE (i.e., online CDMA or online Analog) and flow proceeds to block 144.

In block 144, system determination processor 8 checks if the variable NEXT_STATE is online CDMA. If NEXT_STATE is online CDMA, then in block 146 the CDMA_ACQ_CHANNEL is set to the top entry in CDMA channel table 10, and in block 148 a flag is set indicating that operation was previously conducted on a different system (i.e. analog). If in block 144, the variable NEXT_STATE is not online CDMA or following the execution of block 148, flow returns to block 46 where the operation proceeds as previously described.

Back in control block 74, if the analog exit reason is not normal exit, then the flow moves to block 76 which tests if the analog exit reason is a failed acquisition. If the analog exit reason is failed acquisition, then the flow proceeds to block 180. Block 180 tests if the variable LAST_SYSTEM_ENTERED equals LAST_SYSTEM_WITH_SERVICE. If LAST_SYSTEM_ENTERED equals LAST_SYSTEM_WITH_SERVICE, then the flow moves to block 182. In block 182, LAST_SYSTEM_WITH_SERVICE is set to indicate that no service is currently available, because the variable LAST_SYSTEM_WITH_SERVICE is equal to the analog system that was just exited and the exit reason indicated that the acquisition attempt failed. If the variable LAST_SYSTEM_ENTERED does not equal the value of the variable LAST_SYSTEM_WITH_SERVICE or after execution of block 182, the flow proceeds to block 184, which tests if the reason analog mode was entered was due to a CDMA-to-analog hand-off.

If analog mode was not entered as a result of a CDMA hand-off, then the flow proceeds to block 186. In block 186, the variable CURRENT_SYSTEM is set to the next entry in system preferences table 12. If the last entry in the system preferences table has been reached, then the variable CURRENT_SYSTEM is set to the first entry in system preferences table 12. The flow proceeds to control block 190 which tests if the CURRENT_SYSTEM is the preferred system. If the CURRENT_SYSTEM is not the preferred system, then the flow proceeds to block 550.

In block 550, the variable NEXT_STATE is set based upon the system currently selected for acquisition. Then in block 552, the variable LAST_SYSTEM_ENTERED is set to the value of the variable CURRENT_SYSTEM. The idle timer is enabled in block 554, since the next acquisition attempt will be made for a non-preferred system. In control block 556, system determination processor 8 tests if the value of the variable NEXT_STATE is online CDMA. If the variable NEXT_STATE is online CDMA, then system determination processor 8 sets the CDMA_ACQ_CHANNEL to the top entry in the CDMA channel table 10. Then, in block 560, a flag is set indicating that operation was previously conducted on a different system. In block 562, the CDMA entry reason is set to acquisition and the flow proceeds to block 370, where CDMA mode is entered and control is passed to CDMA modulation and demodulation and processing circuitry 6.

Back in block 556 if NEXT_STATE is not online CDMA, then the flow proceeds to block 564. In block 564, system determination processor 8 tests if there is a CDMA system in system preferences table 12 at a higher preference level than the CURRENT_SYSTEM. If there is a higher preference level than CURRENT_SYSTEM, then the flow proceeds to block 566 where a flag is set to indicate that the CDMA Capability GAM should be monitored. If in block 564 it is determined that there is not a CDMA system at a higher preference level than the analog system currently selected for acquisition, then the flag is set to ignore the CDMA Capability GAM. Following the execution of both blocks 566 and 568, the flow proceeds to block 570 which sets the analog entry reason to acquisition. From block 570, the flow proceeds to block 70 where analog mode is entered and control is passed to analog modulation and demodulation and processing circuitry 4.

Back in block 76, if the analog exit reason was not acquisition failed, then the flow proceeds to control block 78 which tests if the analog exit reason is acquisition terminated. If the analog exit reason is acquisition terminated, then the flow proceeds to control block 230. In block 230, system determination processor 8 tests if the variable LAST_SYSTEM_ENTERED equals the variable LAST_SYSTEM_WITH_SERVICE. If the variable LAST_SYSTEM_ENTERED equals the variable LAST_SYSTEM_WITH_SERVICE, then the flow proceeds to block 232. The variable LAST_SYSTEM_WITH_SERVICE is set to indicate no service is available, because LAST_SYSTEM_WITH_SERVICE is the analog system that was just exited and the exit reason indicated that the analog system is not acceptable for acquisition so service is no longer available.

If in block 230 LAST_SYSTEM_ENTERED does not equal LAST_SYSTEM_WITH_SERVICE or following the execution of block 232, the flow proceeds to block 234 where the variable CURRENT_SYSTEM is set to the next entry in system preferences table 12. If the last entry in system preferences table 12 has been reached, then CURRENT_SYSTEM is set to the top entry in system preferences table 12. The flow proceeds to block 236 which tests if the CURRENT_SYSTEM is the preferred system. If CURRENT_SYSTEM is not the preferred system, then the flow proceeds to block 550 and the operation proceeds as described previously.

If in block 236 the variable CURRENT_SYSTEM is the preferred system, then the flow proceeds to block 238 where the idle timer is disabled, because the next acquisition attempt will attempt to acquire the preferred system. The flow proceeds to block 240, where the variable NEXT_STATE is set based on the value of the variable CURRENT_SYSTEM. Then in block 242, system determination processor 8 tests if NEXT_STATE is online CDMA. If NEXT_STATE is online CDMA, then the flow proceeds to block 244 which sets CDMA_ACQ_CHANNEL to the top entry in the CDMA channel table 10. Then in block 246, a flag is set to indicate that the system in which operation was being conducted has changed, since operation was previously being conducted in analog mode. If in block 242 NEXT_STATE is not online CDMA or following the execution of block 246, the flow proceeds to block 46 and the operation proceeds as described earlier.

Back in block 78 if the analog exit reason is not acquisition terminated, then the flow proceeds to block 80 which tests if the analog exit reason is CDMA Available. If the exit reason is CDMA available, then the flow proceeds to block 280. In block 280, system determination processor 8 sets LAST_SYSTEM_WITH_SERVICE equal to LAST_SYSTEM_ENTERED. It should be noted that the CDMA available exit reason indicates that service was successfully obtained on the analog system that was just exited.

Proceeding to block 282, the variable CURRENT_SYSTEM is set to the top entry in system preferences table 12. In block 284, the idle timer is disabled, and then in block 286 the variable NEXT_STATE is set based on CURRENT_SYSTEM. Proceeding to control block 288, system determination 8 tests if NEXT_STATE is online CDMA. If NEXT_STATE is online CDMA, then the flow goes to block 290 which sets the CDMA_ACQ_CHANNEL equal to the channel specified in the CDMA Capability GAM. Then in block 292, a flag is set to indicate that we were previously operating on a different system (i.e. analog).

Back in block 80 if the analog exit reason is not CDMA available the flow proceeds to block 82. In block 82, if the analog exit reason is idle timeout, then the flow proceeds to block 330. In block 330, the variable LAST_SYSTEM_WITH_SERVICE is set to LAST_SYSTEM_ENTERED. It should be noted that the idle timeout exit reason indicates service was successfully acquired on the analog system just exited. In block 332 CURRENT_SYSTEM is set to the top entry in system preferences table 12. Then in block 334 the idle timer is disabled, since the next acquisition attempt will be on the preferred system. In block 336, the variable NEXT_STATE is set based upon CURRENT_SYSTEM (i.e. online CDMA or online Analog).

In block 338, if NEXT_STATE is online CDMA, then the flow proceeds to block 340 where the CDMA_ACQ_CHANNEL is set to the top entry in CDMA Channel Table 10, and then in block 342 a flag is set to indicate that the system in which operation was being conducted has changed, because operation was previously being conducted in analog mode. If back in block 338 NEXT_STATE is not online CDMA or following the execution of block 342, the flow proceeds to block 46 and the operation proceeds as described earlier.

If, back in block 82, the analog exit reason was not idle timeout, then the flow proceeds to control block 90. In block 90, system determination processor 8 tests if the analog exit reason is an origination command received. If the analog exit reason is an origination command received, then the flow proceeds to block 750. In block 750, CURRENT_SYSTEM and LAST_SYSTEM_ENTERED are set equal to LAST_SYSTEM_WITH_SERVICE. It should be noted that LAST_SYSTEM_WITH_SERVICE indicates the system where service is believed to be currently available. Then in block 752, NEXT_STATE is set based on the value of CURRENT_SYSTEM.

Then in block 754, if NEXT_STATE is online CDMA, then the flow proceeds to block 756. In block 756, the CDMA_ACQ_CHANNEL is set LAST_CHANNEL_WITH_SERVICE, the CDMA acquisition channel where service is available. It is possible this may not be equal to the primary or secondary CDMA acquisition channel for the designated CDMA system. Then in block 758, a flag is set to indicate that the CDMA system to be acquired is different from the system where the previous acquisition attempt was made. Next in block 760, the CDMA entry reason is set to origination and the flow proceeds to block 370, where CDMA mode is entered and control is passed to CDMA modulation and demodulation and processing circuitry 6. If back in block 754, the NEXT_STATE is not online CDMA, then the analog entry reason would be set to origination and the flow would proceed to block 70 where analog mode would be entered with control being passed to analog modulation and demodulation and processing circuitry 4.

If back in block 90, the analog exit reason is not origination command received, then the flow proceeds to control block 92. If in control block 92 the analog exit reason is paging channel lost, then the flow proceeds to block 130 and the operation proceeds as described earlier. If, in block 92, the analog exit reason is not paging channel lost, then the flow proceeds to block 94. If in block 94, the analog exit reason is preferred system changed, then the flow proceeds to block 800. The preferred system exit reason indicates that the user has changed the system preferences and it is necessary to rebuild system preferences table 12 and reset the system determination parameters.

In block 800, the variable LAST_SYSTEM_WITH_SERVICE is set to indicate that no service is available. Proceeding to block 802, system determination processor 8 retrieves system preferences from memory element 14.

Proceeding to block 804, the CDMA_LOCK_STATUS is checked to determine if CDMA is locked. A CDMA locked status indicates that the CDMA system is prohibiting MMSS 1 from accessing the CDMA system. If the CDMA status is locked, then the flow proceeds to block 806, which checks if the user preferences include an analog preference. If in block 806 the user preferences do not include analog then the flow proceeds to block 808 and MMSS 1 enters the offline state. If in block 806, the user preferences do include analog, then the mode preference is set to Analog Only. This allows the MMSS 1 to access the analog systems even though prohibited from accessing the CDMA systems.

In block 804, if the CDMA_LOCK_STATUS indicates the system is not locked or following the execution of block 810, the flow proceeds to block 812. In block 812, both the system preferences table 12 and CDMA channel table 10 are rebuilt. Proceeding to block 814, the variable CURRENT_SYSTEM is set to the top entry in the system preferences table 12 so that the initial acquisition attempt will be on the preferred system of the rebuilt tables. In block 816, the idle timer is disabled, since acquisition will be attempted on the preferred system. In block 818, the variable NEXT_STATE is set based upon the value of CURRENT_SYSTEM. The flow proceeds to control block 820 where if the NEXT_STATE is online CDMA, the flow proceeds to control block 822.

In block 822 if LAST_SYSTEM_ENTERED is not CURRENT_SYSTEM, then the flow proceeds to block 824 where a flag is set to indicate that the CDMA system to be acquired is different from the system where the previous acquisition attempt was made. After the execution of block 824, or if in block 822 LAST_SYSTEM_ENTERED is CURRENT_SYSTEM or if in block 820 if NEXT_STATE is not online CDMA, then the flow proceeds to block 46 and the operation proceeds as previously described.

Back in block 94 if the analog exit reason was not preferred system changed, then the flow proceeds to block 96. If in block 96, the analog exit reason is offline command received, then the flow proceeds to block 98 where MMSS 1 enters the offline state. After the execution of block 98 or if in block 96 the analog exit reason is not offline command received, then the flow proceeds to block 100 and MMSS 1 is powered down.

If back in block 48 CURRENT_SYSTEM is online CDMA, then the flow proceeds to block 370 and control is passed to CDMA modulation and demodulation and processing circuitry 6. When CDMA modulation and demodulation and processing circuitry 6 passes control back to system determination processor 8 in block 372, it provides exit parameters. In blocks 374 through 420, system determination processor 8 examines the exit reason and operates accordingly.

Proceeding to block 374, if the CDMA exit reason is normal exit, then the flow proceeds to block 450. In block 450, the CDMA channel table entries are reordered so that CDMA_ACQ_CHANNEL is at the top of CDMA channel table 10. Then in block 452, system determination processor 8 sets LAST_SYSTEM_WITH_SERVICE to LAST_SYSTEM_ENTERED, because the normal exit reason indicates that service was successfully acquired on the CDMA system just exited. Proceeding to block 454, LAST_CHANNEL_WITH_SERVICE is set to CDMA_ACQ_CHANNEL.

Next, if in block 456 CURRENT_SYSTEM is the preferred system, then the flow proceeds to block 464. In block 464, CDMA_ACQ_CHANNEL is used for re-acquisition of the current CDMA system. After execution of block 464 the flow proceeds to block 462, which sets the CDMA entry reason to resume and the flow proceeds to block 370 where operation proceeds as described earlier.

If, in block 456, CURRENT_SYSTEM is not the preferred system, then the flow proceeds to block 466 where CURRENT_SYSTEM is set to the top entry in system preferences table 12, which is the system comprised of the preferred mode and the preferred serving system. Then in block 468, the idle timer is disabled since the acquisition attempt is being made on the preferred system. In block 470, the variable NEXT_STATE is set based upon CURRENT_SYSTEM.

The flow proceeds to control block 472, where if NEXT_STATE is online CDMA, the flow proceeds to block 474. In block 474, system determination processor 8 sets the CDMA_ACQ_CHANNEL to the top entry of CDMA channel table 10 , which provides either the primary or secondary CDMA acquisition channel in the exemplary embodiment. In block 476, a flag is set to indicate that the system to be used is different from the system used previously, because another CDMA serving system was previously being used. After the execution of block 476 or if in block 472 NEXT_STATE is not online CDMA, the flow proceeds to block 46 where the operation proceeds as described earlier.

If in block 374 the exit reason is not normal exit, then the flow proceeds to block 376. If in block 376 the CDMA exit reason is acquisition failed, then the flow proceeds to block 500. In control block 500, if the variable LAST_SYSTEM_ENTERED equals LAST_SYSTEM_WITH_SERVICE and CDMA_ACQ_CHAN is LAST_CHAN_WITH_SERVICE, then the flow proceeds to block 502. In block 502, LAST_SYSTEM_WITH_SERVICE is set to indicate that no service is currently known to be available, because LAST_SYSTEM_WITH_SERVICE and CDMA_ACQ_CHANNEL correspond to the CDMA system and CDMA acquisition channel where acquisition failed. Following the execution of block 502 or if in block 500 LAST_SYSTEM_ENTERED does not equal LAST_SYSTEM_WITH_SERVICE or CDMA_ACQ_CHAN is not LAST_CHAN_WITH_SERVICE, then the flow proceeds to block 508.

In block 508, system determination processor 8 determines if an acquisition attempt has been made on both primary and secondary CDMA acquisition channels. If acquisition has not been attempted on both acquisition channels, then the flow proceeds to block 504 and CDMA_ACQ_CHANNEL is set to the next acquisition channel in the CDMA Channel table. Note that this implementation allows easy expansion to CDMA systems of any number of channels. The flow proceeds to block 506 where the CDMA entry reason is set to acquisition and then to block 370 where operation proceeds as previously described.

If in block 508, acquisition attempts have been made on both CDMA channels, then the flow proceeds to block 510 where CURRENT_SYSTEM is set to the next entry in the system preferences table 12. If the last entry in system preferences table 12 has been reached, then CURRENT_SYSTEM is set to the first entry in system preferences table 12. Then in block 512 if CURRENT_SYSTEM is not the preferred system, the flow is directed to block 550 and operation proceeds as described earlier, otherwise the flow proceeds to block 514.

In block 514, the idle timer is disabled, since the acquisition attempt will be on the preferred system, then in block 516 NEXT_STATE is set based upon CURRENT_SYSTEM (i.e. online CDMA or online Analog). The flow then proceeds to block 518, where if NEXT_STATE is online CDMA the flow is directed to block 520 where CDMA_ACQ_CHANNEL is set to the top entry in CDMA channel table 10. Then in block 522 a flag indicating a system change is set, since previously attempted acquisition of the CDMA system was with another serving system. Following the execution of block 522 or if in block 518 NEXT_STATE is not online and CDMA, then the flow proceeds to block 46 where operation proceeds as previously described.

If in block 376, the CDMA exit reason is not acquisition failed, then the flow proceeds to block 378. If in block 378, the CDMA exit reason is idle timeout, then the flow proceeds to block 600. In block 600, CDMA channel table 10 is reordered so that the CDMA_ACQ_CHANNEL is at the top of the CDMA channel table 10, since the idle timeout exit reason indicates successful acquisition using the CDMA system specified by LAST_SYSTEM_ENTERED and CDMA_ACQ_CHANNEL. Then in block 602, LAST_SYSTEM_WITH_SERVICE is set to LAST_SYSTEM_ENTERED. Then in block 604, LAST_CHANNEL_WITH_SERVICE is set to the CDMA_ACQ_CHANNEL. Next, in block 606, CURRENT_SYSTEM is set to the top entry of system preferences table 12 because the idle timeout has expired and a check will be made for the presence of the preferred system via an acquisition attempt.

Proceeding to block 608, the idle timer is disabled and in block 610 NEXT_STATE is set based on CURRENT_SYSTEM. Next in control block 612, if the NEXT_STATE is online CDMA, then the flow proceeds to block 614 where the CDMA_ACQ_CHANNEL is set to the top entry of CDMA channel table 10. Then in block 616, a flag is set to indicate that a different system was previously being used since CDMA modulation and demodulation and processing circuitry 6 was using the other serving system. After executing block 616 or if in block 612 NEXT_STATE is not online CDMA, then the flow proceeds to block 46 and operation proceeds as previously described.

Back in block 378 if the CDMA exit reason is not idle timeout, then the flow proceeds to block 380 where if the CDMA exit reason is acquisition terminated, the flow proceeds to 650. If the variable LAST_SYSTEM_ENTERED equals LAST_SYSTEM_WITH_SERVICE and CDMA_ACQ_CHAN is LAST_CHAN_WITH_SERVICE, then the flow proceeds to block 652 where LAST_SYSTEM_WITH_SERVICE is set to indicate that no service is available, since LAST_SYSTEM_WITH_SERVICE and CDMA_ACQ_CHANNEL correspond to the CDMA system and CDMA acquisition channel where acquisition was terminated. Following the execution of block 652 or if in block 650 LAST_SYSTEM_ENTERED does not equal LAST_SYSTEM_WITH_SERVICE or CDMA_ACQ_CHAN is not LAST_CHAN_WITH_SERVICE, then the flow proceeds to block 656.

In block 656, CURRENT_SYSTEM is set to the next entry in system preferences table 12. If the last entry in the system preferences table has been reached, then set CURRENT_SYSTEM to the first entry in system preferences table 12. Then in control block 658, if CURRENT_SYSTEM is not the preferred system, then the flow proceeds to block 550 and the operation proceeds as previously described.

If CURRENT_SYSTEM is the preferred system, the flow proceeds to block 660 where the idle timer is disabled and then in to block 663 where NEXT_STATE is set in based upon CURRENT_SYSTEM. Then in block 664, if NEXT_STATE is online CDMA, then the flow proceeds to block 666 where the CDMA_ACQ_CHANNEL is set to the entry at the top of the CDMA channel table 10. Next in block 668, a flag is set to indicate that the CDMA system to be acquired is different from the system where the previous acquisition attempt was made. Following the execution of block 668 or if in block 664 NEXT_STATE is not online CDMA, then the flow proceeds to block 46 and the operation proceeds as described previously.

If back in block 380, the CDMA exit reason was not acquisition terminated, then the flow proceeds to block 382. If in block 382 the CDMA exit reason is acquisition lost, then the flow proceeds to block 450 and operation proceeds as described previously. If in block 382 the CDMA exit reason is not acquisition lost, then the flow proceeds to block 410. In block 410 if the CDMA exit reason is CDMA hand-off, then the flow proceeds to block 700.

In block 700, CDMA channel table 10 is reordered such that the CDMA_ACQ_CHANNEL is at the top of the table. Note that the CDMA to analog hand-off exit reason indicates that service was successfully acquired on the CDMA system just exited. Then in block 702, LAST_SYSTEM_WITH_SERVICE is set to LAST_SYSTEM_ENTERED. Then in block 704, LAST_CHANNEL_WITH_SERVICE is set to CDMA_ACQ_CHANNEL. In block 706, system determination processor 8 sets up the analog entry parameters with CDMA to analog hand-off parameters.

In control block 708, if the CDMA hand-off is an origination or page response, then the flow proceeds to block 710 where the idle timer is disabled. Then in block 712 a flag is set telling system determination processor 8 to ignore the CDMA available GAM. These steps are taken because for an origination or page response hand-off the analog paging channel will first be acquired and it is not desirable to exit analog mode until the pending call is completed. This is done to prevent exit from analog mode because of an idle timeout or receipt of a CDMA Capability GAM. For the other CDMA to analog hand-off types the mobile station will proceed to directly acquire the analog voice channel where by default the idle timeout and CDMA GAM monitoring are disabled.

Following the execution of block 712 or if in block 708 the CDMA hand-off is not origination or page response, the flow proceeds to block 714. In block 714 the analog entry reason is set to CDMA to analog hand-off and then the flow proceeds to block 70 and operation proceeds as described previously.

If back in block 410 the CDMA exit reason is not CDMA hand-off then the flow proceeds to block 412. If in block 412 the CDMA exit reason is because a lock or unlock order was received, then the flow proceeds to block 720 where the CDMA lock status is updated. The flow then proceeds to block 800 and the operation proceeds as previously described. If in block 412 the CDMA exit reason is not a lock or unlock order, the flow proceeds to block 414. In block 414, if the CDMA exit reason is because of incompatible protocol revision then the flow proceeds to block 650 and the operation proceeds as previously described.

If in block 414 the CDMA exit reason is not incompatible protocol, the flow proceeds to block 416. If in block 416 the CDMA exit reason is an origination command was received, aborting the CDMA acquisition attempt in progress, then the flow proceeds to block 750 and the operation proceeds as described previously. If in block 416 the CDMA exit reason is not origination command received, the flow proceeds to block 418. If in block 418 the CDMA exit reason is because the user changed the preferred system, then the flow proceeds to block 800 and the operation proceeds as described earlier.

If in block 418 the CDMA exit reason is not preferred system change, then the flow proceeds to block 420. In block 420 if the CDMA exit reason is offline command received, then the flow proceeds to block 422. In block 422 the offline mode is entered. Following the execution of block 422 or if in block 420 the CDMA exit reason is not offline command received, then the flow proceeds to block 424 and MMSS 1 powers down.

It should again be noted that although the present invention is described as a dual mode subscriber station capable of communicating in either an analog or CDMA format, the present invention is equally applicable to other communication formats. The present invention can be applies to any combination of the following exemplary formats: analog, TACs, GSM, etc. in addition to CDMA and analog formats as described herein.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus for providing mobile communications in both a code division multiple access (CDMA) communication system and an analog communication system, comprising:

a system preferences memory area for storing system preferences:

a CMDA channel memory area for storing a list of CDMA channels:

a user preferences memory area for storing a list of user preferences:

analog modulation and demodulation and processing means for transmitting and receiving information signals in accordance with an analog format wherein said analog format is determined in accordance with entry mode parameters;

CDMA modulation and demodulation and processing means for transmitting and receiving said information signals in accordance with a CDMA format wherein said CDMA format is determined in accordance with said entry mode parameters; and system determination means for selecting said entry mode parameters and for selectively providing said transmission format to said analog modulation and demodulation and processing means and said CDMA modulation and demodulation and processing means in response to said system preferences, said user preferences, and said CDMA channels.

2. The apparatus of claim 1 wherein said analog modulation and demodulation and processing means is further for providing analog exit parameters indicative of a reason for stopping communications using said analog modulation and demodulation and processing means and wherein said system determination means is responsive to said analog exit parameters.

3. The apparatus of claim 1 wherein said CDMA modulation and demodulation and processing means is further for providing CDMA exit parameters indicative of a reason for stopping communications using said CDMA modulation and demodulation and processing means and wherein said system determination means is responsive to said CDMA exit parameters.

4. The apparatus of claim 3 wherein when a preferred system stored in said system preferences memory area is not available for acquisition, said system determination means selects a last system with service as a system upon which to attempt communications, and wherein if said last system with service was an analog system, said system determination means passes control to said analog modulation and demodulation and processing means.

5. The apparatus of claim 2 wherein when a preferred system stored in said system preferences memory area is not available for acquisition, said system determination means selects a last system with service as a system upon which to attempt communications, and wherein if last system with service was a CDMA system, said system determination means passes control to said CDMA modulation and demodulation and processing means.

6. The apparatus of claim 1 wherein said list of CDMA channels is initially ordered according to said system preferences.

7. The apparatus of claim 6 wherein said CDMA channel list includes a preferred channel, and wherein said CDMA channel list is reordered each time a CDMA channel different from said preferred channel is acquired.

8. The apparatus of claim 1 wherein said system determination means is further for providing an analog service resume signal to said analog modulation and demodulation and processing means to prevent said analog modulation and demodulation and processing means from powering down if said apparatus attempts re-acquisition using the same analog system as it has just exited.

9. The apparatus of claim 1 wherein said system determination means is further for providing a CDMA service resume signal to said CDMA modulation and demodulation and processing means to prevent said CDMA modulation and demodulation and processing means from powering down if said apparatus attempts re-acquisition using the same CDMA system as it has just exited.

10. A method for providing mobile communications in both a code division multiple access (CDMA) communication system and an analog communication system, said method comprising the steps of:

storing system preferences;

storing a list of CDMA channels;

storing a list of user preferences:

communicating information signals in accordance with an analog format wherein said analog format is determined in accordance with entry mode parameters;

communicating said information signals in accordance with a CDMA format wherein said CDMA format is determined in accordance with said entry mode parameters; and determining said entry mode parameters in accordance with a set of system determination rules, user preferences and an exit reason from a system in which acquisition was last attempted.

11. The method of claim 10 further comprising the step of generating analog exit parameters indicative of a reason for stopping analog communications.

12. The method of claim 10 further comprising the step of generating CDMA exit parameters indicative of a reason for stopping CDMA communications.

13. The method of claim 10 further comprising the step of, when a preferred system is not available for acquisition, attempting acquisition upon a last system with service.

14. The apparatus of claim 2 further comprising a timer for counting a predetermined time period when communicating using a non-preferred communication system, and wherein said system determination means determines whether a preferred system is available upon expiration of said predetermined time period.

15. The method of claim 10 wherein said list of CDMA channels is initially ordered according to said system preferences, said list of CDMA channels including a preferred channel, said method further comprising the step of re-ordering said list of CDMA channels each time a CDMA channel different from said preferred channel is acquired.

16. The method of claim 10 further comprising the step of providing an analog service resume signal if acquisition is attempted using the same analog system as it has just exited.

17. The method of claim 10 further comprising the step of providing a CDMA service resume signal if acquisition is attempted using the same analog system as it has just exited.

* * * * *

UNITED STATES PATENT AND TRADEMARK OFFICE
CERTIFICATE OF CORRECTION

PATENT NO : 5,754,542
DATED : May 19, 1998
INVENTOR(S) : Ault et al

It is certified that error appears in the above-identified patent and that said Letters Patent is hereby corrected as shown below:

In the Abstract, line 4, change "a" to --an--.

Col. 1, line 16, change "for" to --of--.

Col. 1, line 27, after "entitled" and before "SPREAD", insert therein --"--.

Col. 1, line 34, delete the second occurrence of the word "a".

Col. 1, line 55, change "store" to --stores--.

Col. 2, line 3, change "system" to --System--.

Col. 2, line 19, after "then" and before "apparatus" insert therein --the--.

Col. 3, line 44, change "signal" to --signals--.

Col. 4, line 1, change "implement" to --implemented--.

Col. 4, lines 62-63, change "an analog" to --a CDMA--.

Col. 5, line 37, change "attempt" to --attempts--.

Col. 6, line 54, after "service" and before ";", insert therein --)--.

Col. 7, line 36, change "mode and analog" to --mode, analog--.

Col. 8, line 5, after "determination" and before "8", insert therein --processor--.

Col. 8, line 6, change "mode element" to --modulation and demodulation and processing means--.

Col. 8, line 12, after "determination" and before "8", insert therein --processor--.

Col. 9, lines 66-67, after "determination" and before "8", insert therein --processor--.

UNITED STATES PATENT AND TRADEMARK OFFICE
CERTIFICATE OF CORRECTION

PATENT NO : 5,754,542
DATED : May 19, 1998
INVENTOR(S) : Ault et al

It is certified that error appears in the above-identified patent and that said Letters Patent is hereby corrected as shown below:

Col. 10, line 43, after "from" and before "memory", insert therein --nonvolatile--.

Col. 10, line 44, after "determination" and before "8", insert therein --processor--.

Col. 11, line 15, change "indicating" to --indicate--.

Col. 14, line 36, after "set", insert --to--.

Col. 14, lines 67, change "memory element" to --nonvolatile memory--.

Col. 17, line 65, change "663" to --662--.

In claim 1, line 6, change ":" to --;--.

In claim 1, line 7 change "CMDA" to --CDMA--.

In claim 1, line 8, change ":" to --;--.

In claim 1, line 10, change ":" to --;--.

In claim 1, lines 22-23, change "transmission format" to --entry mode parameters--.

In claim 5, line 5, after "if" and before "last", insert therein --said--.

Signed and Sealed this

Eighteenth Day of May, 1999

Attest:

Q. TODD DICKINSON

Attesting Officer

Acting Commissioner of Patents and Trademarks